United States Patent
Goad

(10) Patent No.: US 8,955,711 B2
(45) Date of Patent: Feb. 17, 2015

(54) LINERS AND LININGS FOR TANKS

(76) Inventor: Curtis Goad, Ballwin, MO (US)

( * ) Notice: Subject to any disclaimer, the term of this patent is extended or adjusted under 35 U.S.C. 154(b) by 105 days.

(21) Appl. No.: 13/427,426

(22) Filed: Mar. 22, 2012

(65) Prior Publication Data
US 2013/0248524 A1    Sep. 26, 2013

(51) Int. Cl.
| | | |
|---|---|---|
| *B65D 6/28* | (2006.01) | |
| *B29C 63/30* | (2006.01) | |
| *B65D 90/04* | (2006.01) | |
| *B65D 90/08* | (2006.01) | |
| *B29C 65/42* | (2006.01) | |
| *B29C 65/48* | (2006.01) | |
| *B29C 65/54* | (2006.01) | |
| *B29C 65/56* | (2006.01) | |
| *B29C 65/72* | (2006.01) | |
| *B29C 65/00* | (2006.01) | |
| *B29C 65/52* | (2006.01) | |
| *B29C 63/48* | (2006.01) | |
| *B29L 31/00* | (2006.01) | |
| *B29C 63/02* | (2006.01) | |

(52) U.S. Cl.
CPC .............. *B29C 63/30* (2013.01); *B65D 90/04* (2013.01); *B65D 90/08* (2013.01); *B29C 65/42* (2013.01); *B29C 65/4815* (2013.01); *B29C 65/54* (2013.01); *B29C 65/562* (2013.01); *B29C 65/72* (2013.01); *B29C 66/1162* (2013.01); *B29C 66/30341* (2013.01); *B29C 66/4326* (2013.01); *B29C 66/43421* (2013.01); *B29C 66/61* (2013.01); *B29C 66/71* (2013.01); *B29C 66/861* (2013.01); *B29C 63/486* (2013.01); *B29C 65/425* (2013.01); *B29C 65/525* (2013.01); *B29L 2031/7126* (2013.01); *B29C 2063/021* (2013.01)

USPC .............................. 220/677; 220/612; 220/1.6

(58) Field of Classification Search
USPC ............... 220/678, 679, 680, 613, 4.12, 4.13, 220/23.9, 1.6, 612, 677, 688, 622; 206/524.3; 403/337
See application file for complete search history.

(56) References Cited

U.S. PATENT DOCUMENTS

| | | | | |
|---|---|---|---|---|
| 2,384,067 A | * | 9/1945 | Ballintine | ..................... 220/665 |
| 3,279,971 A | | 10/1966 | Gardener | |
| 3,485,409 A | * | 12/1969 | Becker | ..................... 220/560.07 |
| 3,658,627 A | | 4/1972 | Kaminsky | |
| 3,853,669 A | | 12/1974 | Werstlein | |
| 3,951,308 A | | 4/1976 | Thirtle | |

(Continued)

OTHER PUBLICATIONS

Extrusion Welding of Thermoplastics, the Professional Division of the Welding Institute, Mar. 2002, http://www.twi.co.uk/professional/protected/band_3/jk57.html; 3 pages.

(Continued)

*Primary Examiner* — Jeffrey Allen
(74) *Attorney, Agent, or Firm* — Harness, Dickey & Pierce, P.L.C.

(57) ABSTRACT

According to various aspects, exemplary embodiments are disclosed liners, linings, tanks including the same, and methods of providing liners and linings for tanks. In an exemplary embodiment, a liner or lining includes a bottom sheet and a plurality of side sheets. At least one pair of adjacent side sheets is joined by an extrusion weld along an interface between the pair of adjacent side sheets. The extrusion weld is coupled to at least one mechanical fastener which is coupled to at least one structural component such that the pair of adjacent side sheets is anchored to the structural component.

28 Claims, 14 Drawing Sheets

(56) References Cited

U.S. PATENT DOCUMENTS

| | | |
|---|---|---|
| 4,102,726 A | 7/1978 | Brackman |
| 4,457,457 A | 7/1984 | Dziki |
| 4,796,676 A | 1/1989 | Hendershot et al. |
| 4,942,978 A | 7/1990 | Bessette |
| 5,345,666 A | 9/1994 | Matyja |
| 5,505,814 A | 4/1996 | Gläser et al. |
| 5,804,112 A | 9/1998 | Greene |
| 5,814,175 A | 9/1998 | Rau et al. |
| 5,820,718 A | 10/1998 | Dean |
| 5,836,363 A | 11/1998 | LaFleur |
| 5,867,883 A | 2/1999 | Iorio et al. |
| 5,979,686 A | 11/1999 | Dean |
| 6,394,534 B1 | 5/2002 | Dean |
| 6,431,387 B2 * | 8/2002 | Piehler ............... 220/495.01 |
| 6,579,439 B1 | 6/2003 | Chandler |
| 7,111,497 B2 | 9/2006 | Goad et al. |
| 8,133,345 B2 | 3/2012 | Goad |
| 2001/0004992 A1 | 6/2001 | Kawasaki et al. |
| 2001/0011672 A1 | 8/2001 | Aota et al. |
| 2001/0023566 A1 | 9/2001 | Ezumi et al. |
| 2002/0119336 A1 | 8/2002 | Kawasaki et al. |
| 2003/0056459 A1 | 3/2003 | Ezumi et al. |
| 2004/0067381 A1 | 4/2004 | Grund et al. |
| 2005/0011159 A1 | 1/2005 | Standal et al. |
| 2005/0129796 A1 | 6/2005 | Bortoli |
| 2006/0051442 A1 | 3/2006 | Miceli et al. |
| 2006/0054661 A1 | 3/2006 | Di Miceli et al. |
| 2006/0057241 A1 | 3/2006 | Di Miceli et al. |
| 2008/0245471 A1 * | 10/2008 | Goad ............... 156/258 |
| 2010/0025337 A1 * | 2/2010 | Yencho ............... 210/748.1 |
| 2012/0121359 A1 * | 5/2012 | Bray et al. ............... 411/82 |

OTHER PUBLICATIONS

Plastic Welding, The Plastics Distributor & Fabricator, Mar./Apr. 2003, http://www.plasticsmag.com/features.asp?fIssue=Mar/Apr-03; 6 pages.

Tanks and Liners: Is Conventional Wisdom or Reliance on Internet-Based Answers Putting your Company at Risk?; Curtis Goad; Dec. 3, 2010; http;//www.pfonline.com/articles; 8 pages.

http://www.sunbeltstudwelding.com/weldstuds/arc_headconachor.htm; ; Feb. 29, 32012; 1 pg.

http://www.atlasmin.com/products/corrosion_resistant/pdf/4-5000ps--7-05.pdf; Atlas Data Sheet; 2005; 4 pgs.

* cited by examiner

LINERS AND LININGS FOR TANKS

FIELD

The present disclosure generally relates to liners, linings, tanks including the same, and methods of providing liners and linings for tanks.

BACKGROUND

This section provides background information related to the present disclosure which is not necessarily prior art and which has been recognized by the inventor.

Process tanks are commonly used to store contents such as acids and chemicals. These tanks relate to immobile types that may be installed above or below the ground, but also for the transportable types that are part of the over-the-road semi-trailers. The tanks may also be used on or in marine vessels as well as railroad cars. The size of the tank is not material, but the larger process tanks typically hold 1,000 gallons or more. Moreover, process tanks are particularly adaptable for tanks intended for highly corrosive liquids, but also may be used in conjunction with other pourable materials such as grain and pellets.

Over time, process tanks may become corroded as a result of the corrosive fluids stored therein or because of the rusting action of the exterior elements (e.g., ground water, rain, etc.). If the material stored in a tank is corrosive, the corrosive material can contact the tank. In this situation, the life expectancy of the tank is relatively short and thus it becomes not only extremely expensive for replacement, but also highly dangerous for people and the environment. Furthermore, there is danger in the event that the tank will leak or rupture, or somehow fail to retain the contents and leak the contents into the ground (if the tanks are subterranean). If they are above-the-ground storage tanks or if the tanks are over-the-road type, there is danger along the highways and to the passing public. Accordingly, many process tanks utilize a protective lining.

In a current lining procedure, the interior of the surface of a tank 10 (FIG. 1) may first need to be prepared to receive the lining 14. This preparation includes surface blasting the interior of the tank 10 and subsequent cleaning of the interior of the tank 10. With respect to the lining 14, the lining sheets 16 (FIG. 2) may be from a roll of lining material. At the installation site, an adhesive may be applied to cut the sheets 16 of lining 14. Then, the lining sheets 16 are manually applied to the interior of the tank 10. As known in the art, heat may be applied to the lining sheets 16 to assist in applying the lining sheets 16 to the tank wall. Tanks typically have protrusions such as tank welds that bond the tank walls to the tank bottom. These tank welds protrude into the interior of the tank 10. Even careful placement of the sheets 16 may result in gaps between the sheets 16 that are placed over the protruding welds. In other words, the sheets 16 will lay over the protrusions further enhancing the gaps between the sheets 16.

As shown in FIG. 2, the cutting of the lining 14 may result in uneven and/or rough edges 18 for each lining sheet 16. When the sheets 16 are bonded to the tank 10 and next to each other, the rough edges 18 of the sheets 16 do not evenly match thus resulting in gaps 20 forming between the sheets 16. Even when the lining 14 is cut with relatively smooth edges 18, installation gaps 20 can still exist between the adjacent sheets 16 due to the difficult and labor intensive installation process (FIG. 3). For example, the sheets 16 are heavy and difficult to manage when the sheets 16 are being positioned within the tight constraints of the process tank 10 which is a confined space with elevated temperatures. As such, adjacent sheets 16 may be applied in a non-uniform layout and/or with a distance between them, further enhancing the gaps 20 between the edges 18 of the sheets 16. Applying the sheets 16 at a corner of the tank 10 is particularly troublesome due to the space and angle considerations of the corner of the tank 10.

After the lining sheets 16 are applied and adhesive attached to the tank walls, weld strips 22 (known as a "cap over flat strip weld" or a "cap over corner strip weld") may be welded along the interfaces between each pair of adjacent sheets 16 (FIGS. 2 and 3). The weld strips 22 may be manually welded to the adjacent lining sheets 16. The welder used in this process heats the weld strips 22 to the sheets 16. Similar to the application of the sheets 16, hand welding the weld strips 22 is a labor-intensive process. Maintaining consistent pressure with the welder is difficult since the touch of the installer applies the pressure. Additionally, it is difficult with the hand welder to maintain a constant distance between the welding nozzle and the weld strip 22. Furthermore, the weld strip 22 may melt faster than the sheet 16, so the welding process must be done with special care. The sheets 16 must be heated to a glossy state, yet the weld strip 22 or the sheets 16 cannot be charred, as that would result in a failed weld.

The installer typically welds from the top of the lining sheet 16 to the bottom. As the process tank 10 may have a height such as twelve feet, this height causes starts and stops as opposed to continuous welds with tightly controlled temperatures and consistency in both pressure and timing. In addition, welding occurs within the tight constraints of the process tank 10 such that the installer does not provide a constant weld over any length of time. The tedious and laborious process for strip welding not only applies to welding strips to corner sheets, but it also applies to welding strips for sheets applied to the walls of the process tank 10.

The human element of welding the strips 22 leads to weak welds (inconsistency of temperature, pressure and timing—the critical variables for welds) and leads to voids or "pinholes" 24 within the weld that bonds the weld strip 22 to the sheets 16 (FIG. 4). The pinholes 24 shown in FIG. 4 are exaggerated for purposes of clarity. Although the welded strip 22 may pass a "spark test" commonly used in the art, these pinholes 24 lead to problems for the process tank 10. Furthermore, the corner weld that bonds sides and the bottom of the process tank 10 further exaggerates the effects of the gaps 20 and the pinholes 24 since the sheet 16 must position over the corner weld of the process tank 10. This corner weld or other obstacles leaves a void between the sheet 16 and the tank weld.

When the tank 10 is filled with fluid 12 (FIG. 1) such as an acid, the pressure of the fluid forces the fluid 12 through the pinholes 24. Consequently, the fluid 12 forces through the gaps 20 and disperses between the lining 14 and the tank 10. This leaked fluid then corrosively attacks the tank wall. Additionally, this leaked fluid may also corrosively attack the bond or adhesive interface between the lining 14 and the tank wall resulting in the lining 14 pulling away from the tank wall. Accordingly, the gaps 20 and the pinholes 24 between the lining sheets 16 lead to adverse and dangerous conditions. When the installer repairs the welded strip, the heat from the repair welder draws the leaked fluid toward the interface of the adjacent sheets 16, wherein this fluid further attacks the tank wall positioned behind the repaired weld strip.

SUMMARY

This section provides a general summary of the disclosure, and is not a comprehensive disclosure of its full scope or all of its features.

According to various aspects, exemplary embodiments are disclosed liners, linings, tanks including the same, and methods of providing liners and linings for tanks. In an exemplary embodiment, a method includes extrusion welding at least one pair of sheets together by infusing molten thermoplastic material along an interface between the pair of sheets and about at least a portion of at least one mechanical fastener coupled to at least one structural component to thereby form an extrusion weld. The extrusion weld joins the pair of sheets and is coupled to the mechanical fastener, whereby the pair of sheets is anchored to the structural component by the mechanical fastener coupled to the structural component and the extrusion weld coupled to the mechanical fastener.

Another exemplary embodiment includes an apparatus (e.g., a liner, lining, etc.) for lining a tank. In this exemplary embodiment, the apparatus includes a bottom sheet and a plurality of side sheets. At least one pair of adjacent side sheets is joined by an extrusion weld along an interface between the pair of adjacent side sheets. The extrusion weld is coupled to at least one mechanical fastener which is coupled to at least one structural component such that the pair of adjacent side sheets is anchored to the structural component.

In another exemplary embodiment, a tank includes a bottom sheet and a plurality of side sheets. At least one pair of adjacent side sheets is joined by an extrusion weld along an interface between the pair of adjacent side sheets. The extrusion weld is coupled to at least one mechanical fastener which is coupled to at least one structural component such that the pair of adjacent side sheets is anchored to the structural component.

Further areas of applicability will become apparent from the description provided herein. The description and specific examples in this summary are intended for purposes of illustration only and are not intended to limit the scope of the present disclosure.

DRAWINGS

The drawings described herein are for illustrative purposes only of selected embodiments and not all possible implementations, and are not intended to limit the scope of the present disclosure.

Figure 12:
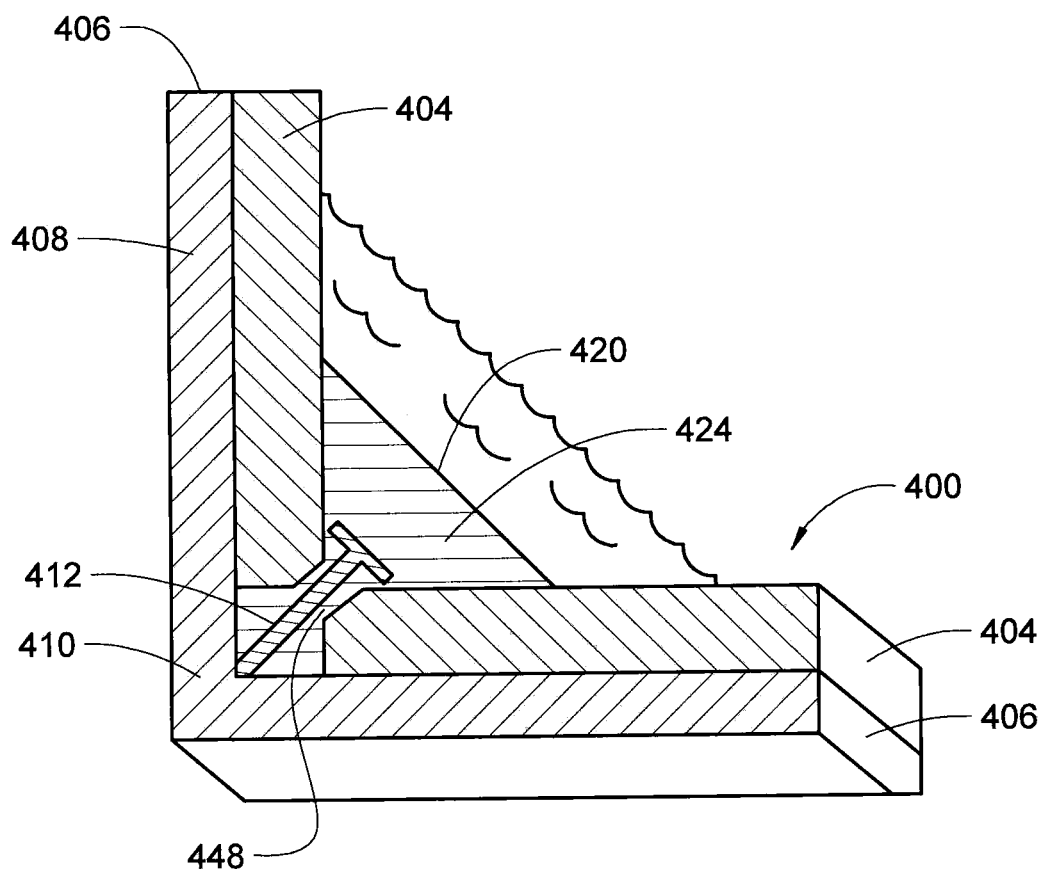
Figure 13:
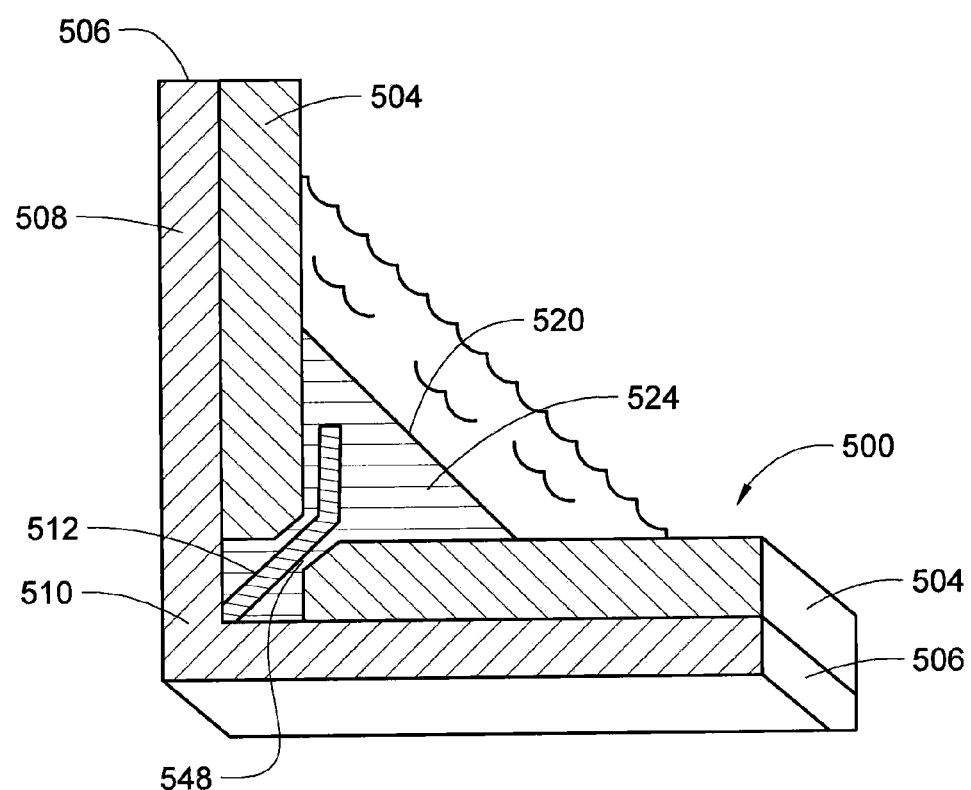
Figure 14:
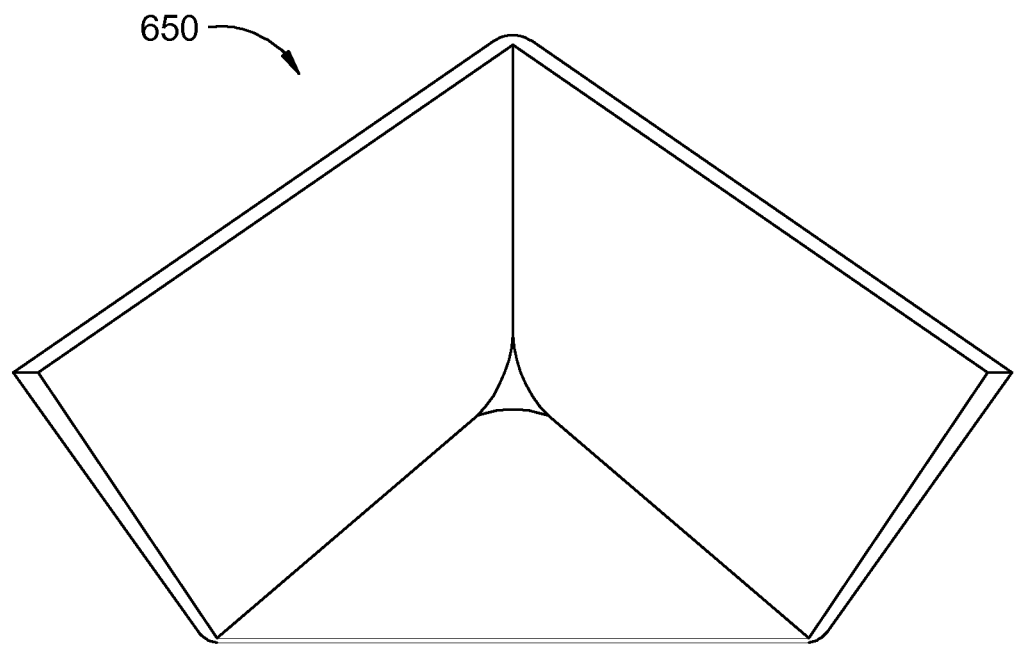
Figure 15:
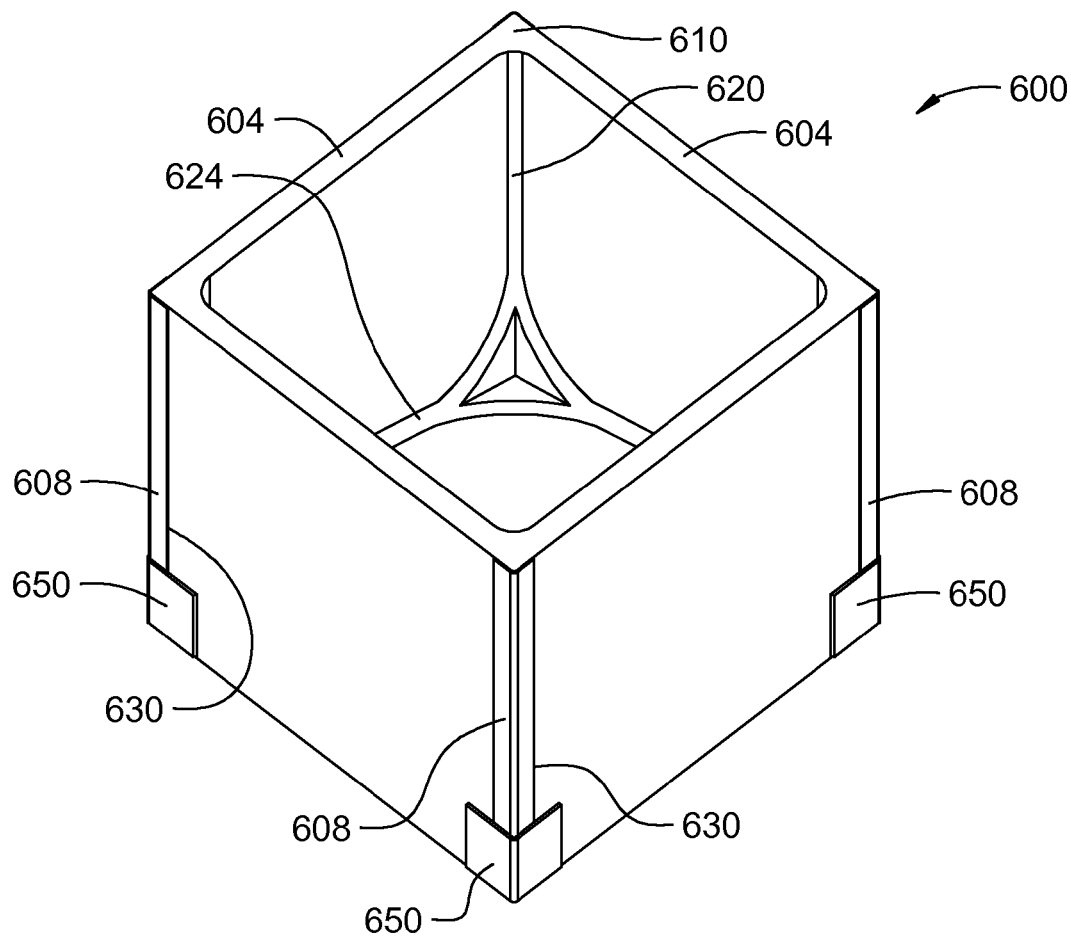
Figure 16:
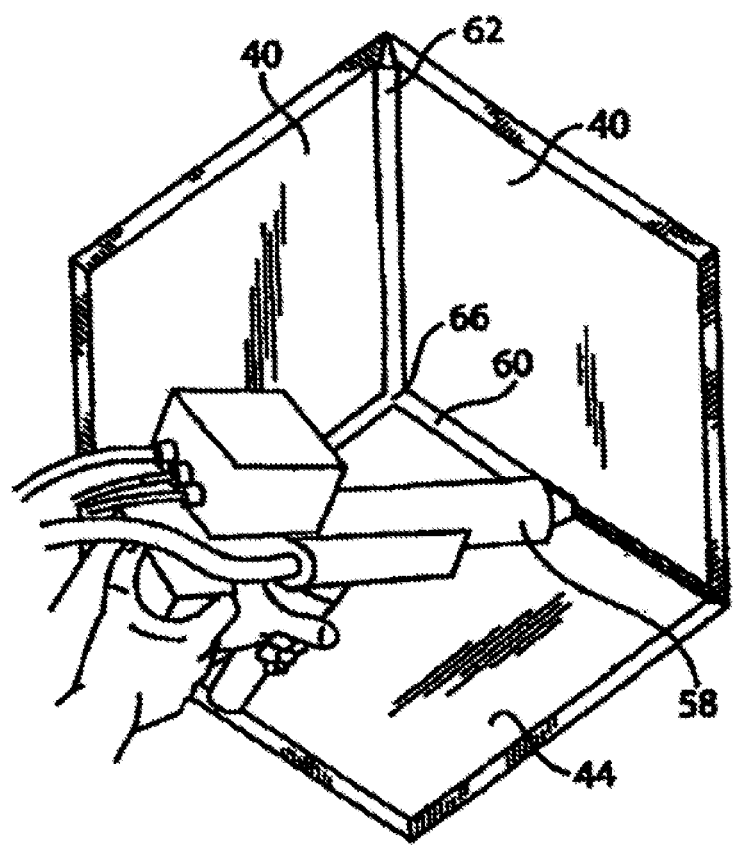

FIG. 12 is a partial perspective view of a corner of a lining anchored to walls of a tank by extrusion welds and mechanical fasteners according to another exemplary embodiment, and illustrating the exemplary manner by which the extrusion weld and thus the sheets of lining material are anchored to the tank by weld studs attached to the tank and by the extrusion weld being held or retained by the weld studs;

FIG. 13 is a partial perspective view of a corner of a lining anchored to walls of a tank by extrusion welds and mechanical fasteners according to another exemplary embodiment, and illustrating the exemplary manner by which the extrusion weld and thus the sheets of lining material are anchored to the tank by bent pins attached to the tank and by the extrusion weld being held or retained by the bent pins;

FIG. 14 is a perspective view of a bottom corner piece for a frame structure or liner (preferably one at each bottom corner) to absorb impact if the liner is dropped to thereby provide protection against and inhibit cracking of the frame structure according to an exemplary embodiment; and FIG. 15 is a perspective view of a liner anchored to a frame by extrusion welds and mechanical fasteners, and also including the corner piece shown in FIG. 14 at each of the bottom corners according to an exemplary embodiment; and FIG. 16 is a perspective view of an example of a handle-held extrusion-welding device that may be used in exemplary embodiments.

DETAILED DESCRIPTION

Example embodiments will now be described more fully with reference to the accompanying drawings.

According to various aspects, exemplary embodiments are disclosed of liners, linings, tanks including the same, and methods of providing liners and linings for tanks. In such exemplary embodiments, an apparatus (e.g., liner, lining, etc.) for lining a tank may be formed from sheets, panels, or walls extrusion welded together by infused thermoplastic material. Mechanical fasteners and extrusion welds anchor the sheets to at least one or more structural components by the mechanical fasteners being coupled (e.g., anchored, fastened, attached, etc.) to the structural component and the extrusion welds being coupled (e.g., anchored, held, retained, etc.) by the mechanical fasteners. A liner or lining may be anchored in this manner to a wide range of structural components, such as a frame, a framework, a frame member, a tank, a wall, a support member, a reinforcing member, an outer shell, combinations thereof, other structures or components, etc.

For example, an exemplary embodiment of a lining includes sheets, panels, or walls of lining material anchored in the corners of the lining to corresponding corners of a tank by extrusion welding and mechanical fasteners. The lining may be anchored to the tank by the mechanical fasteners and extrusion welding such that adhesive is not needed or used between the sheets, panels, or walls of lining material and tank walls. In which case, failure of the non-existent or unnecessary adhesive over time or due to high temperatures is no longer an issue.

As another example, an exemplary embodiment of a liner includes sheets, panels, or walls of liner material anchored in the corners of the liner to a frame or framework by extrusion welding and mechanical fasteners. By way of example only, the liner may be fully assembled and anchored to the frame prior to shipping to an installation site. At the installation site, the liner may be installed and positioned within a tank without having to first prep (e.g., blast, grind, prime, apply adhesive, etc.) the tank's interior surface and/or without having to remove an existing lining, if there is one. In addition, exemplary embodiments of a liner may be configured as a "drop-in" free-standing liner that is positioned within a tank without bonding the liner to the tank's surfaces.

Also disclosed are exemplary embodiments of methods relating to liners and linings for tanks. For example, an exemplary embodiment of a method includes anchoring sheets, panels, or walls of a liner to at least one or more structural components (e.g., a frame, tank, outer shell, etc.) by extrusion welding and mechanical fasteners. The method may include extrusion welding at least one pair of sheets together by infusing molten thermoplastic material along an interface between the pair of sheets and about at least a portion of at least one mechanical fastener coupled to at least one structural component to thereby form an extrusion weld. The extrusion weld joins the pair of sheets and is coupled to the mechanical fastener, whereby the pair of sheets is anchored to the structural component by the mechanical fastener coupled to the structural component and the extrusion weld coupled to the mechanical fastener. Accordingly, these exemplary embodiments anchor the extrusion welds and thus the sheets of liner or liner material as the mechanical fasteners are anchored (e.g., fastened, coupled, etc.) to the structural component (e.g., a frame, a framework, a tank, a frame member, a support member, a reinforcing member, other structures or components, etc.) and the extrusion welds are anchored (e.g., held, retained, etc.) by the mechanical fasteners.

As disclosed herein, exemplary embodiments of liners may include sheets, panels, or walls of liner material (e.g., flexible PVC or vinyl sheeting, etc.) anchored to a frame or framework (e.g., drywall corner beads, wooden frame, plastic frame, rigid PVC frame, stainless steel frame, carbon steel frame, wood-plastic composite or plastic wood frame, single piece frame, multi-piece frame, tack welded and preassembled rigid PVC multi-piece frame, etc.) by extrusion welding and mechanical fasteners (e.g., screws, screws and washers, rivets, pins, weld studs, other fasteners or anchoring devices, etc.). In such exemplary embodiments, mechanical fasteners are fastened to portions of the frame that are or will be located at the corners of the liner, which corners are defined between or by adjacent pairs of corner sheets of liner material. The mechanical fasteners and pairs of adjacent corner sheets are relatively positioned such that portions of the mechanical fastener are located within gaps, voids, beveled regions, etc. separating opposing edges of the pairs of adjacent corner sheets prior to extrusion welding. Depending on the particular application, the mechanical fasteners may be positioned relative to the pairs of adjacent corner sheets before or after being fastened to the frame or framework. Molten thermoplastic material is infused along the pairs of adjacent corner sheets by extrusion welding such that molten thermoplastic material infuses within the gaps, voids, beveled regions, etc. between the pairs of adjacent corner sheets. This extrusion welding also infuses molten thermoplastic material over and/or around portions of the mechanical fasteners. After the molten thermoplastic material cools and solidifies, the solidified molten thermoplastic material surrounding, encapsulating, and/or in contact with portions of the mechanical fasteners allows the mechanical fasteners to help anchor (e.g., hold, retain, etc.) the extrusion welds. Accordingly, these exemplary embodiments anchor the extrusion welds and thus the sheets of liner material in the corners as the mechanical fasteners are anchored (e.g., fastened, etc.) to the frame or framework and the extrusion welds are anchored (e.g., held, retained, etc.) by the mechanical fasteners.

Also disclosed herein are exemplary embodiments of linings that may include sheets, panels, or walls of lining material (e.g., flexible PVC or vinyl sheeting, etc.) anchored to a tank (e.g., steel tank, etc.) by extrusion welding and mechanical fasteners (e.g., rivets, pins, other fasteners or anchoring devices, etc.). In such exemplary embodiments, mechanical fasteners are fastened to portions of the tank walls that are or will be located at the corners of the lining. The mechanical fasteners and pairs of adjacent corner sheets are relatively positioned such that portions of the mechanical fastener are located within gaps, voids, beveled regions, etc. separating opposing edges of the pairs of adjacent corner sheets prior to extrusion welding. Depending on the particular application, the mechanical fasteners may be positioned relative to the pairs of adjacent corner sheets before or after being fastened to the tank. Molten thermoplastic material is infused along the pairs of adjacent corner sheets by extrusion welding such that molten thermoplastic material infuses within the gaps, voids, beveled regions, etc. between the pairs of adjacent corner sheets. This extrusion welding also infuses molten thermoplastic material over and/or around portions of the mechanical fasteners. The infused molten thermoplastic material may penetrate the joint to the tank walls such that infused weld areas are created that help eliminate channels, pinholes, gaps, etc. behind the weld seams, which, in turn, helps reduce the probability of leaks and helps increase the service life of the tank. If a leak happens, then the welds help block solution from flowing behind the lining. After the molten thermoplastic material cools and solidifies, the solidified molten thermoplastic material surrounding, encapsulating, and/or in contact with portions of the mechanical fasteners allows the mechanical fasteners to help anchor (e.g., hold, retain, etc.) the extrusion welds. Accordingly, these exemplary embodiments anchor the extrusion welds and thus the sheets of lining material in the corners as the mechanical fasteners are anchored (e.g., fastened, etc.) to the tank and the extrusion welds are anchored (e.g., held, retained, etc.) by the mechanical fasteners.

Additional exemplary embodiments include liners or linings that are not fully bonded to the floors and walls of tanks as are some conventional linings. Instead, this exemplary embodiment anchors the liner or lining along the bottom of the tank and along upper edge portions or vertical perimeters of the tank.

Figure 1:
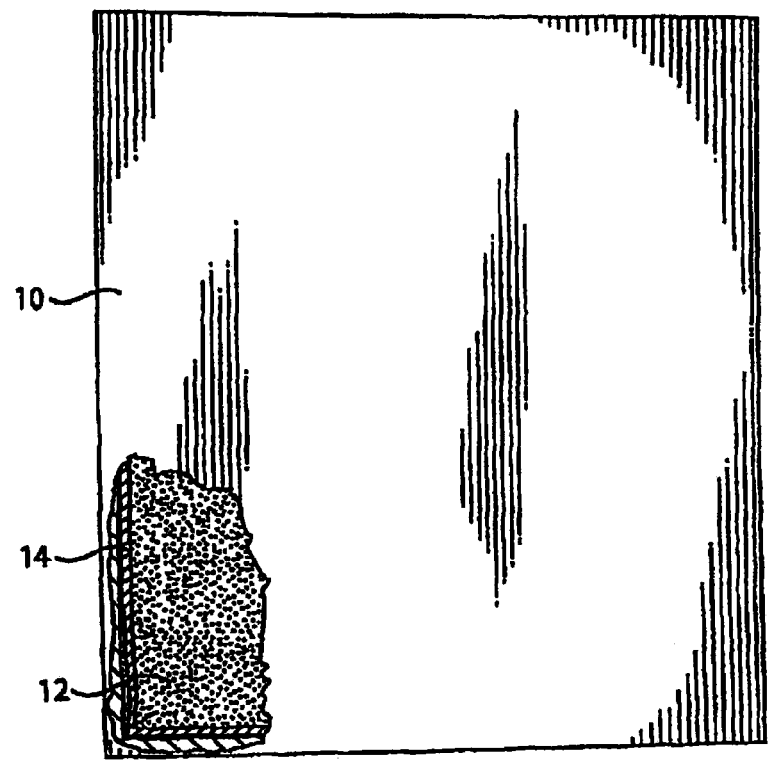
FIG. 1 is a front elevation view of a storage tank with a partial cross sectional view thereof illustrating a current bonded lining applied to the tank walls, and a fluid stored therein which fluid has seeped through the lining and is between the tank walls and the lining.
Figure 2:
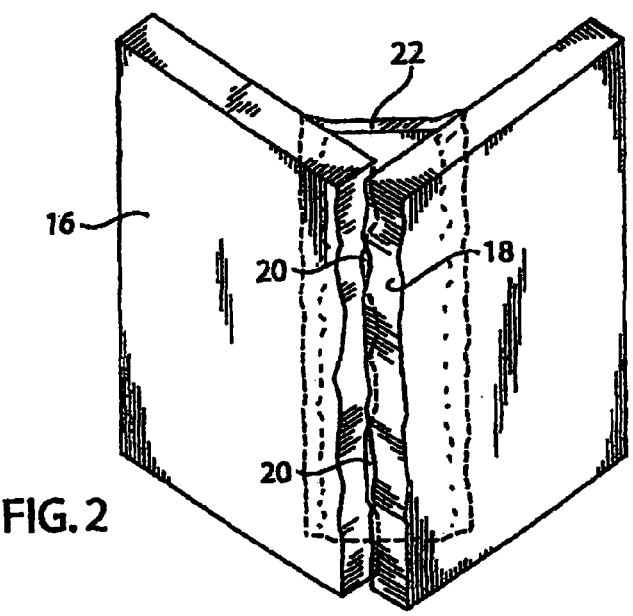
FIG. 2 is a partial perspective view of a corner of a current lining illustrating a pair of lining sheets, a welded strip weld between the pair of lining sheets, and gaps between the lining sheets.
Figure 3:
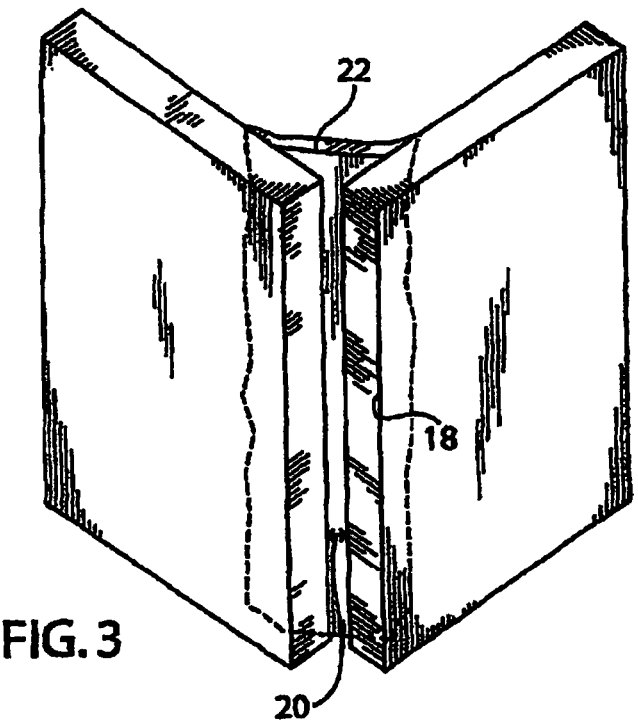
FIG. 3 is a partial perspective view of a corner of another current lining illustrating a pair of lining sheets having smooth edges, a welded strip weld between the pair of lining sheets, and a gap between and along the length of the edges of the lining sheets.
Figure 4:
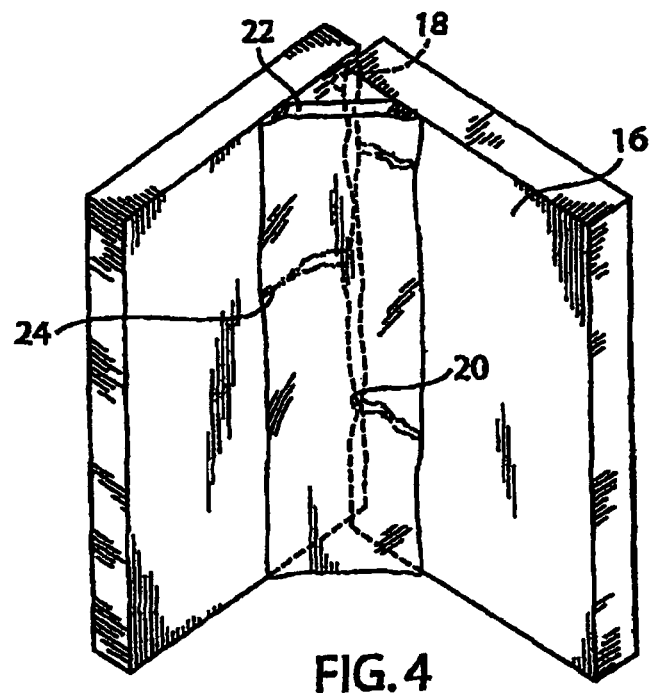
FIG. 4 is a front perspective of the lining sheets, weld strip, and gaps shown in FIG. 3, and further illustrating pinholes formed in the weld that bonds the weld strip to the lining sheets.
Figure 5:
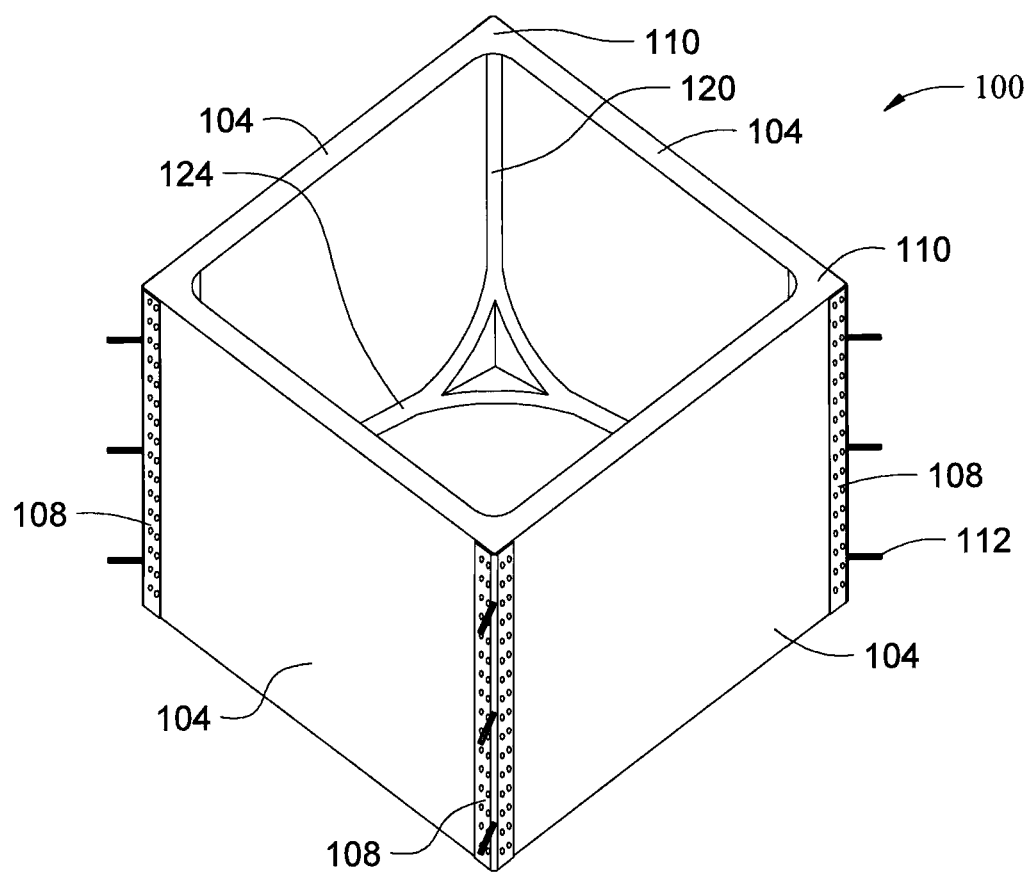
FIG. 5 is a perspective view of a liner anchored to a drywall corner bead by extrusion welding and mechanical fasteners according to an exemplary embodiment.
Figure 6:
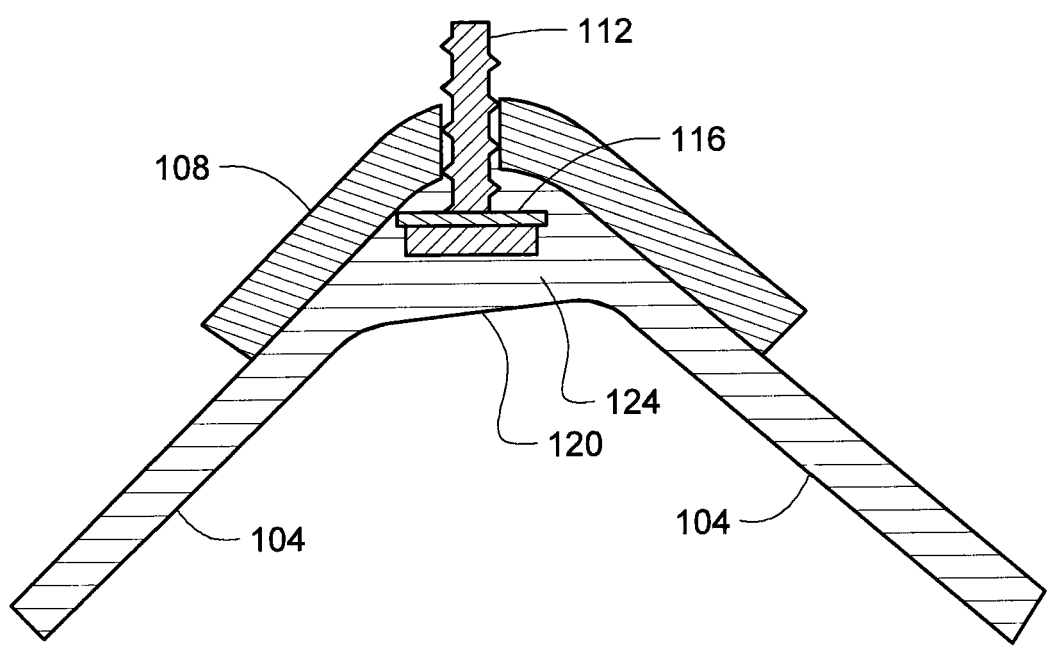
FIG. 6 is a cross-sectional view of a corner of the liner shown in FIG. 5, and illustrating the exemplary manner by which the extrusion weld and thus the sheets of liner material are anchored to the drywall corner bead by screws attached to the drywall corner bead and by the extrusion weld being held or retained by the screws and washers.
Figure 7:
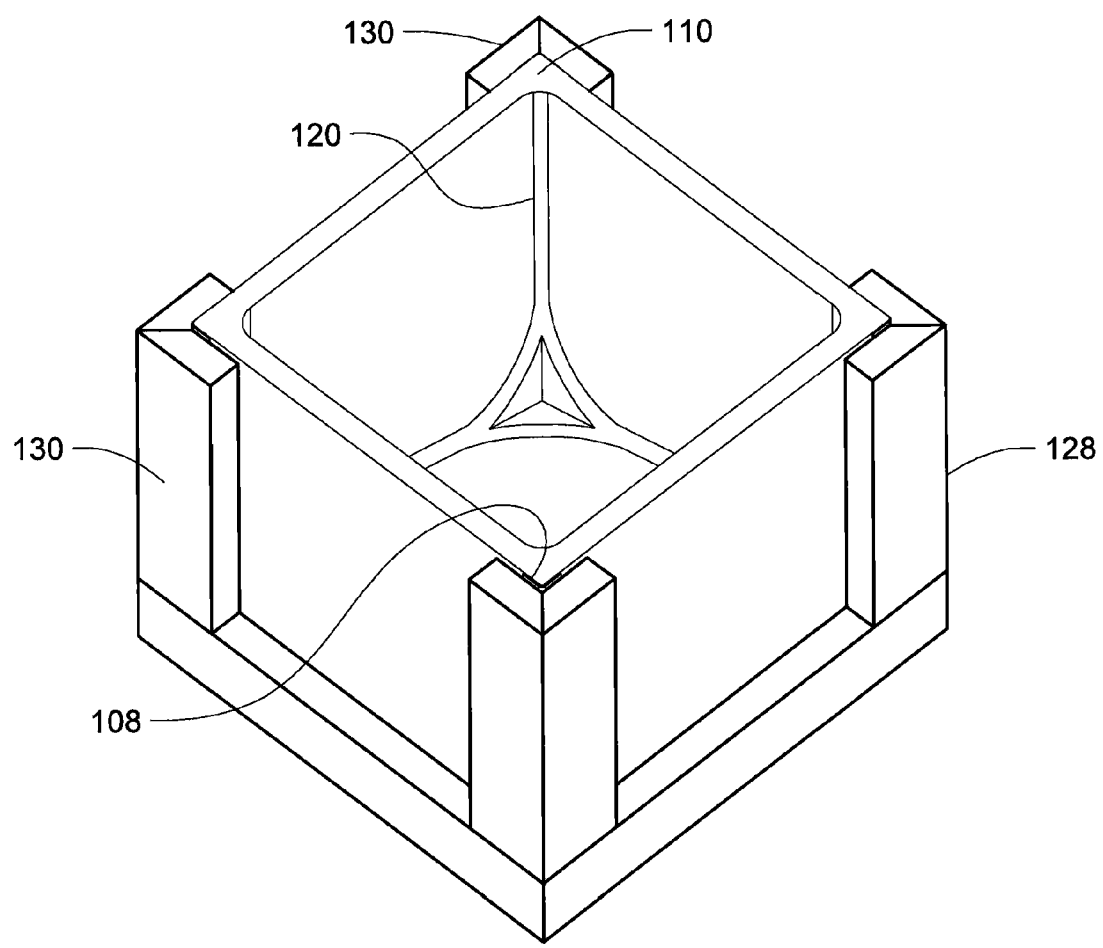
FIG. 7 is a perspective view illustrating the liner shown in FIG. 5 and a wooden frame attached to the drywall corner beads at the corners of the liner according to an exemplary embodiment.

With reference now to the figures, FIGS. 5 through 7 illustrate an exemplary embodiment of a liner 100 embodying one or more aspects of the present disclosure. As shown, the liner 100 includes sheets, panels, or walls 104 of liner material.

Drywall corner beads 108 are anchored to the corners 110 of the liner 100 by screws 112, washers 116, and extrusion welds 120.

The corners 110 of the liner 100 are defined between or by adjacent pairs of corner sheets 104 of liner material and weld material. Prior to extrusion welding, the sheets 104 are separated by gaps or voids along their edges. The sheets 104 are joined by infused welds 120 formed by extrusion welding, such that the infused welds 120 fills the gaps between the sheets 104 and seals the sheets 104 such that the liner 200 is capable of isolating a tank from contents (e.g., contents being stored and/or processed, etc.) within the lined tank, as the contents contact the liner's sheet 104 instead of the tank walls.

As shown in FIG. 6, the screw 112 is attached or screwed into to the drywall corner bead 108. Prior to extrusion welding, the screw 112 is positioned relatively between the pairs of adjacent corner sheets 104 such that at least a portion of the threaded shank of the screws 112 passes through the gap or void separating opposing edges of the pairs of adjacent corner sheets 104. The washer 116 and the head of the screw 112 are within or adjacent to the gap or void between the pairs of adjacent corner sheets 104. Depending on the particular application, the screws 112 may be positioned relative to the pairs of adjacent corner sheets 104 before or after the screws 112 are attached to or screwed into the drywall corner beads 108.

Molten thermoplastic material 124 is introduced or infused along the pairs of adjacent corner sheets 104 by extrusion welding such that molten thermoplastic material 124 infuses within the gaps, voids, beveled regions, etc. between the pairs of adjacent corner sheets 104. This extrusion welding also introduces or infuses molten thermoplastic material 124 over and/or around the washers 116 and the screws' heads and threaded shank portions as shown in FIG. 6. After the molten thermoplastic material 124 cools and solidifies, the solidified molten thermoplastic material surrounding, encapsulating, and/or in contact with the screws 112 and washers 116 allows the screws/washers to help anchor (e.g., hold, retain, etc.) the extrusion welds 120. Accordingly, this exemplary embodiment anchors the extrusion welds 120 and thus the sheets 104 of liner material in the corners 110 as the screws 112 are anchored (e.g., fastened, etc.) to the drywall corner beads 108 and the extrusion welds 120 are anchored (e.g., held, retained, etc.) by the screws 112 and washers 116.

The drywall corner beads 108 may be electrically-conductive (e.g., metal, etc.) which allows pre-leak testing such as high frequency "spark" testing and/or by a testing method disclosed in U.S. Pat. No. 7,111,497, U.S. Pat. No. 8,133,345, and/or U.S. patent application Ser. No. 13/396,231, the entire contents of which are incorporated herein by reference. Other suitable electrically-conductive means (e.g., electrically-conductive adhesive cement, metal foil, electrically-conductive coatings, etc.) may be used between a liner and a frame in other embodiments.

In this exemplary embodiment, the drywall corner beads 108 may be considered as members of a frame or framework to which the liner 100 is anchored. In other exemplary embodiments, the liner 100 may be anchored to additional or other structural components with or without the drywall corner beads 108, such as a plastic frame, wooden frame, rigid PVC frame, stainless steel frame (e.g., frame made of stainless steel angle, etc.), carbon steel frame (e.g., frame made of carbon steel angle, etc.), wood-plastic composite or plastic wood frame, single piece frame, multi-piece frame, tack welded and preassembled rigid PVC multi-piece frame, outer rigid PVC shell, etc.

For example, FIG. 7 illustrates an exemplary embodiment in which a wooden frame 128 is attached to the drywall corner beads 108 at the corners 110 of the liner 100. In this example, the wooden frame 128 (e.g., exoskeletal frame structure, etc.) includes members or components 130 externally disposed along the corners 110 and bottom edges of the liner 100. The wooden frame 128 may include a full bottom plate. The frame members 130 along the corners 110 are attached (e.g., mechanically fastened via screws, etc.) to the drywall corner beads 108. In alternative embodiment, a liner may be anchored to a structural component (e.g., an outer shell 308 (FIG. 11), etc.) which has sidewalls and a bottom wall externally disposed along the corresponding sidewalls and bottom of the liner 100.

Figure 8:
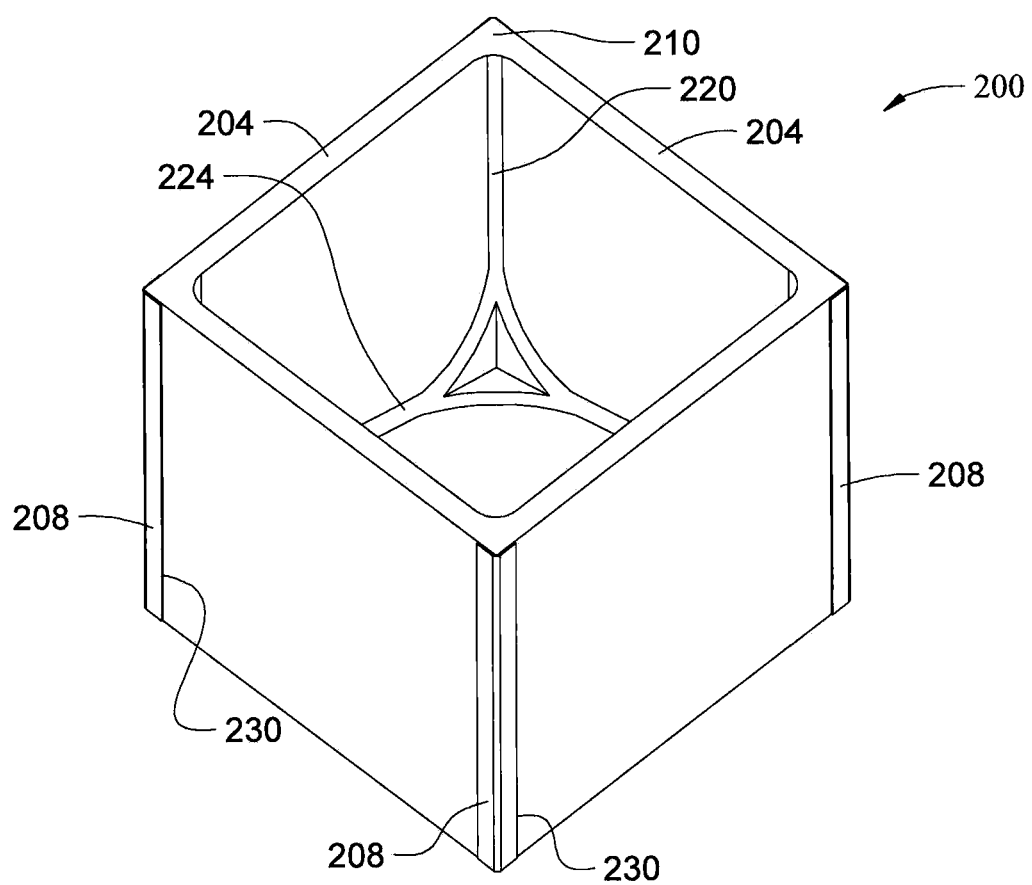
FIG. 8 is a perspective view of a liner anchored to a frame by extrusion welds and mechanical fasteners according to another exemplary embodiment.
Figure 9:
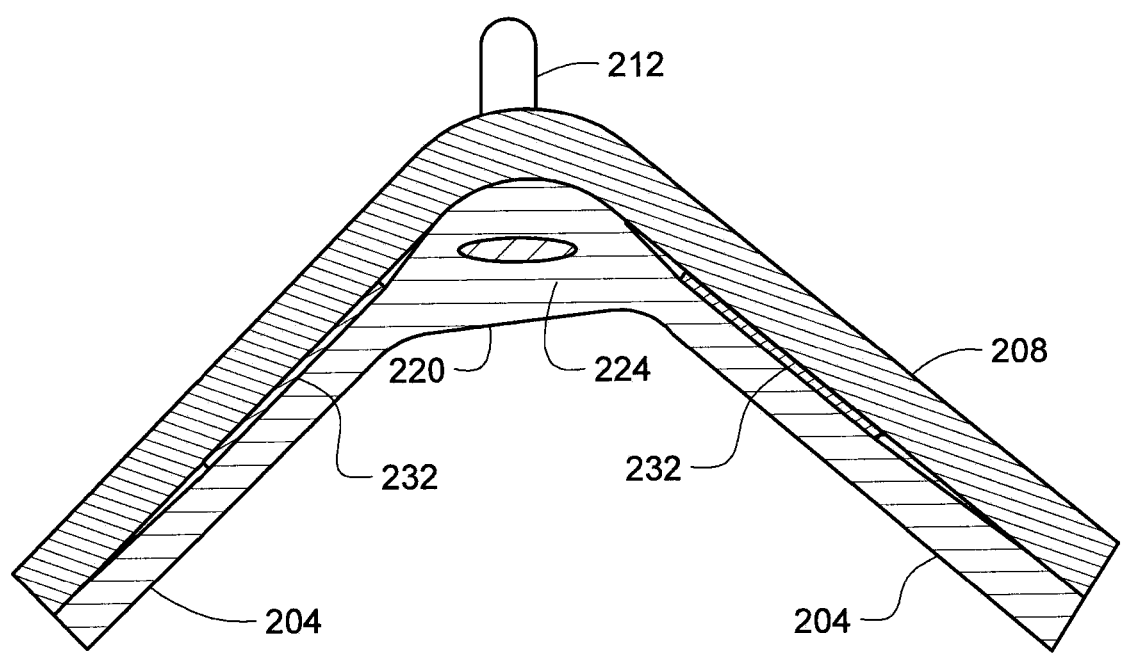
FIG. 9 is a cross-sectional view of a corner of the liner shown in FIG. 8, and illustrating the exemplary manner by which the extrusion weld and thus the sheets of liner material are anchored to the frame by rivets attached to the frame and by the extrusion weld being held or retained by the rivets.
Figure 10:
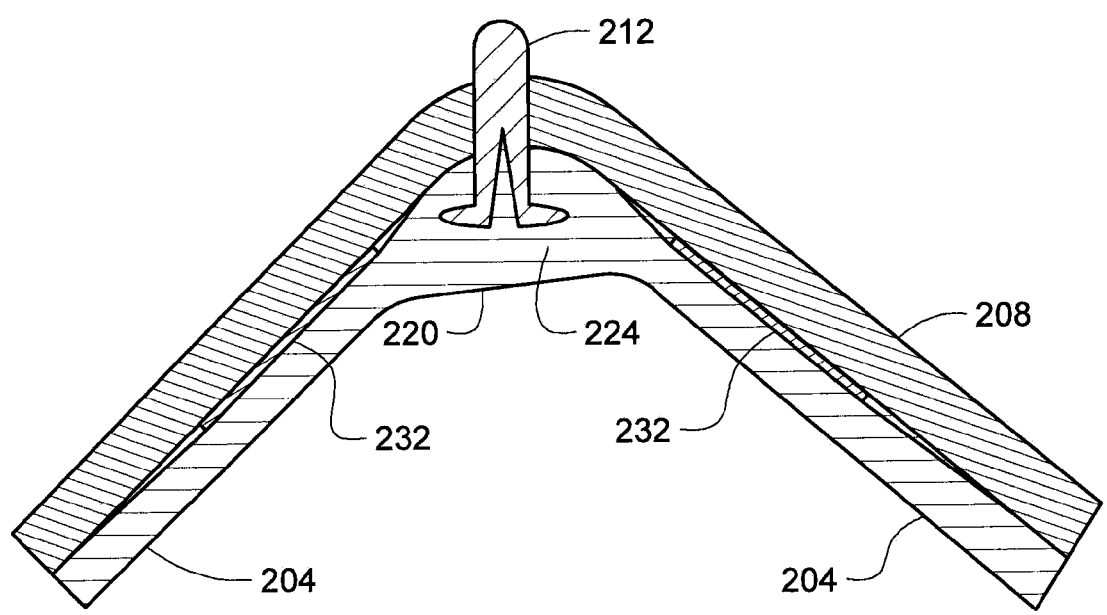
FIG. 10 is another cross-sectional view of a corner of the liner shown in FIG. 8, and illustrating the exemplary manner in which extrusion weld material has infused into the hollow shaft of the rivet according to an exemplary embodiment.

FIGS. 8 through 10 illustrate another exemplary embodiment of a liner 200 embodying one or more aspects of the present disclosure. The liner 200 includes sheets, panels, or walls 204 of liner material anchored in the corners 210 of the liner 200 to a frame or framework 208 by rivets 212 and extrusion welds 220.

The corners 210 of the liner 200 are defined between or by adjacent pairs of corner sheets 204 of liner material and weld material. Prior to extrusion welding, the sheets 204 are separated by gaps or voids along their edges. The sheets 204 are joined by infused welds 220 formed by extrusion welding, such that the infused welds 220 fills the gaps between the sheets 204 and seals the sheets 204 such that the liner 200 is capable of isolating a tank from contents (e.g., contents being stored and/or processed, etc.) within the lined tank, as the contents contact the liner's sheet 204 instead of the tank walls.

By way of example only, the frame 208 in this exemplary embodiment comprises a tack welded preassembled rigid PVC multi-piece frame. In other exemplary embodiments, the frame 208 may comprise a differently configured frame such as a frame made of wood or other materials disclosed herein.

Prior to extrusion welding, the rivets 212 are coupled to or driven into the frame 208. Also prior to extrusion welding, the rivets 212 are positioned relative to pairs of adjacent corner sheets 204 such that at least portions of the rivets' shafts pass through gaps, voids, beveled regions, etc. separating opposing edges of the pairs of adjacent corner sheets 204. As shown in FIGS. 9 and 10, the rivets' heads are also located within or adjacent to the gaps, voids, beveled regions, etc. between the pairs of adjacent corner sheets. Depending on the particular application, the rivets 212 may be positioned relative to the pairs of adjacent corner sheets 204 before or after being driven into and anchored to the frame 208.

Molten thermoplastic material 224 is introduced or infused along the pairs of adjacent corner sheets 204 by extrusion welding such that molten thermoplastic material 224 infuses within the gaps, voids, beveled regions, etc. between the pairs of adjacent corner sheets 204. This extrusion welding also introduces or infuses molten thermoplastic material 224 over and/or around the rivets' heads and shaft portions that are within the gaps, voids, beveled regions, etc. between the pairs of adjacent corner sheets 204.

In some embodiments, the rivets 212 may have hollow shafts such that molten thermoplastic material 224 infuses into and within the hollow shafts of the rivets as shown in FIG. 9. The portion of the rivet 212 protruding through and outwardly beyond the frame 208 as shown in FIG. 9 may be removed (e.g., cut, sheared off, etc.) prior to installation in a tank. If extrusion welding is performed while the liner 200 is within a tank, molten thermoplastic material may flow through the hollow rivets and reach the tank walls. In which case, molten thermoplastic material may then remediate and repair the tank such as by filing crevices, etc. if the tank walls are corroded.

After the molten thermoplastic material 224 cools and solidifies, the solidified molten thermoplastic material surrounding, inside, and/or in contact with the rivets 212 allows the rivets 212 to help anchor (e.g., hold, retain, etc.) the extrusion welds 220. Accordingly, this exemplary embodiment anchors the extrusion welds 220 and thus the sheets 204 of liner material in the corners 210 as the rivets 212 are anchored to (e.g., driven into, etc.) the frame 208 and the extrusion welds 220 are anchored (e.g., held, retained, etc.) by the rivets 212.

By way of further example, the liner sheets 204 and/or frame 208 may be made from rigid polyvinylchloride, chlorinated polyvinyl chloride (CPVC), polyethylene, polypropylene, copolymer polypropylene, polyvinylidene fluoride (PVDF), Kynar® polyvinylidene fluoride (PVDF), etc. Electrically-conductive material may be disposed between the liner sheets 204 and frame 208, such that the electrically-conductive material with a ground connection allows for leak detection, permeation monitoring, and/or spark testing.

In the exemplary embodiment shown in FIG. 8, the liner 200 is anchored to a structural component comprising a frame 208 (e.g., exoskeletal frame structure, etc.) that has members or components 230 externally disposed along the corners 210 of the liner 200. The frame 208 may include a full bottom plate. In alternative embodiments, a liner may be anchored to structural component (e.g., an outer shell, etc.) that has sidewalls and a bottom wall externally disposed along the corresponding sidewalls and bottom of the liner.

Figure 11:
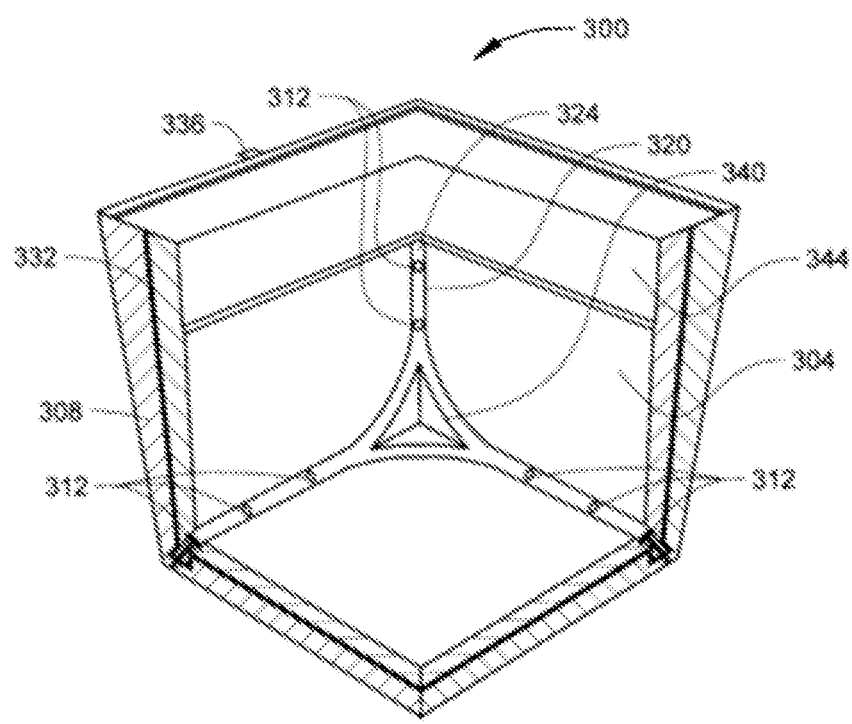
FIG. 11 is a partial perspective view of a liner anchored to an outer shell by extrusion welds and mechanical fasteners according to another exemplary embodiment.

For example, FIG. 11 illustrates an exemplary embodiment of a liner 300 that includes sheets 304 anchored to an outer shell 308 (e.g., rigid polyvinyl chloride, etc.) by mechanical fasteners 312 (e.g., rivets, etc.) and extrusion welds 320. In this example, the outer shell 308 has sidewalls and a bottom wall corresponding in size and/or shape to the interior liner sheets 304 (e.g., flexible polyvinyl chloride, etc.). Accordingly, the exemplary embodiment illustrated in FIG. 11 may advantageously provide a double barrier protection via the inner liner sheets 304 and outer shell 308, such that there is triple protection when the liner 300 is within a tank.

In this exemplary embodiment shown in FIG. 11, double sided electrically-conductive material 332 (e.g., lead or aluminum foil attached via double sided adhesive tape, etc.) is disposed between the liner sheets 304 and the outer shell 308. The tape 332 may help hold the sheets 304 in place relative to the outer shell 308 before the sheets 304 are anchored to the outer shell 308 by the rivets 312 and extrusion welds 320. The liner 300 also includes a pre-leak checking tab 336 (e.g., metal "spark" test tab, etc.) such that the pre-leak checking tab 336 and electrically-conductive medium 332 between the liner 300 and outer shell 308 allows pre-leak testing. The outer shell 308 has a ground connection to allow for leak detection, permeation monitoring, DC spark testing, etc. In alternative embodiments, other suitable electrically-conductive means (e.g., electrically-conductive adhesive cement, metal foil, metal drywall corner bead, etc.) may be used between a liner and a frame to allow pre-leak testing such as high frequency "spark" testing and/or by a testing method disclosed in U.S. Pat. No. 7,111,497, U.S. Pat. No. 8,133,345, and/or U.S. patent application Ser. No. 13/396,231.

With continued reference to FIG. 11, a corner insert 340 (e.g., molded triangular insert, etc.) is extrusion welded to a corner of the liner 300, which corner is formed by the pairs of adjacent corner sheets and a bottom sheet. The corner insert 340 is configured (e.g., molded, etc.) to have a triangular shape. For example, the insert 340 may be generally hollow and have a truncated triangular pyramidal configuration (triangular pyramidal frustum). Extrusion welding the insert 340 to the corner of the liner 300 may include infusing molten thermoplastic material at a predetermined distance beyond the insert 340 and along the infused pair of sheets and bottom sheet. In this example, infusing molten thermoplastic material comprises introducing the thermoplastic material through and/or over and/or into the intersection of the associated sheets and insert 340. Thermoplastic material is infused under the controlled parameters of constant pressure and constant temperature over time to help reduce, minimize, or preferably eliminate pinholes. This welding enhances the strength of the weld between the insert 340 and the corner of the liner 300. In an exemplary embodiment, the predetermined distance beyond the insert 340 has a range of about two inches to about four inches, the thickness of the sheets may be at least about $3/32$ inches, and the thickness of the insert 340 may have a range of about $3/16$ inches to about $3/8$ inches. The installer may then repeat the welding of inserts 340 to each of the remaining corners of the liner 300.

Various materials may be used for the liner's sheets 304, thermoplastic material 324, corner inserts 340, and outer shell 308, such as the exemplary materials referred to herein. In an exemplary embodiment, the liner's sheets 304, thermoplastic material 324, and corner inserts 340 may comprise plasticized polyvinyl chloride (e.g., Koroseal® material, etc.), while the outer shell 308 comprises high-impact rigid polyvinyl chloride. By way of further example, the liner sheets 304, outer shell 308, and/or inserts 340 may be made from rigid polyvinylchloride, chlorinated polyvinyl chloride (CPVC), polyethylene, polypropylene, copolymer polypropylene, polyvinylidene fluoride (PVDF), Kynar® polyvinylidene fluoride (PVDF), etc.

FIG. 11 also illustrates a skirt or sacrificial layer 344, which may be formed from Teflon® polytetrafluoroethylene (PTFE) or other suitable material. The sacrificial layer 344 may be provided towards the top of the liner 300 and may thus be exposed to the ambient air. Reactive solution may then chemically attack the sacrificial layer 344 instead of the liner sheets 304. The skirt or sacrificial layer 344 may comprise a sacrificial layer as disclosed in U.S. patent application Ser. No. 13/396,231 and/or U.S. Pat. No. 8,133,345. For example, the sacrificial layer 344 may comprise a polyvinylidene fluoride (PVDF) material commonly known as Kynar® PVDF. Other materials may also be used for the sacrificial layer and/or other means may be used for bonding the sacrificial layer to the liner 300. Depending on the particular contents to be stored and/or processed, the liner 300 may also be used as a tank itself for storing and/or processing contents without the liner 300 having to be positioned within a tank. The exemplary embodiment of the liner 300 may advantageously have a relatively long service life, solid, strong, and fewer welds as compared to conventional liners.

Depending on the particular contents to be stored and/or processed, the liner 300 may also be used as a tank itself for storing and/or processing contents without the liner having to be positioned within a tank. The liner 300 may advantageously have a relatively long service life, solid, strong, and fewer welds as compared to conventional liners.

FIG. 12 illustrates an exemplary embodiment of a lining 400 embodying one or more aspects of the present disclosure. As shown, the lining 400 includes sheets, panels, or walls 404 that are anchored in the corners 410 of the lining 400 to a tank 408 (e.g., steel tank, etc.) by stud welds or anchors 412 and extrusion welds 420.

The corners 410 of the lining 400 are defined between or by adjacent pairs of corner sheets 404 and weld material. Prior to extrusion welding, the sheets 404 are separated by gaps or voids 448 along their edges. The sheets 404 are joined by infused welds 420 formed by extrusion welding, such that the infused welds 420 fills the gaps 448 between the sheets 404 and seals the sheets 404 such that the lining 400 is capable of isolating the tank 408 from contents (e.g., contents being stored and/or processed, etc.) within the lined tank 408, as the contents contact the lining 400 instead of the tank walls 406.

Prior to extrusion welding, the stud welds or anchors 412 are coupled to (e.g., welded via a capacitive discharge stud welder, etc.) corner portions of the tank walls 406 corresponding to the corners 410 of the lining 400. Also prior to extrusion welding, the stud welds 412 may be positioned relative to the pairs of adjacent corner sheets 404 such that portions (e.g., shaft, head, etc.) of the stud welds 412 are located within the gaps or voids 448 separating opposing edges of the pairs of adjacent corner sheets 404.

Molten thermoplastic material 424 is introduced or infused along the pairs of adjacent corner sheets 404 by extrusion welding such that molten thermoplastic material 424 infuses within the gaps or voids 448 between the pairs of adjacent corner sheets 404. This extrusion welding also introduces or infuses molten thermoplastic material 424 over and/or around portions of the stud welds 412.

After the molten thermoplastic material 424 cools and solidifies, the solidified molten thermoplastic material surrounding, encapsulating, and/or in contact with portions of the stud welds 412 allows the stud welds 412 to help anchor (e.g., hold, retain, etc.) the extrusion welds 420. Accordingly, this exemplary embodiment anchors the extrusion welds 420 and thus the sheets 404 of lining material in the corners 410 as the stud welds 412 are anchored (e.g., welded, etc.) to the tank 408 and the extrusion welds 420 are anchored (e.g., held, retained, etc.) by the stud welds 412.

Infused molten thermoplastic material 424 may penetrate the joint to the tank walls 406 such that infused weld areas are created that help eliminate channels, pinholes, gaps, etc. behind the weld seams, which, in turn, helps reduce the probability of leaks and helps increase the service life of the tank. If a leak happens, then the welds help block solution from flowing behind the lining 400. Accordingly, the exemplary embodiment of the lining 400 may advantageously have a relatively long service life, have welds that are solid and strong (more tolerable to stresses), and have fewer welds as compared to conventional linings.

FIG. 13 illustrates an exemplary embodiment of a lining 500 embodying one or more aspects of the present disclosure. As shown, the lining 500 includes sheets, panels, or walls 504 that are anchored in the corners 510 of the lining 500 to a tank 508 (e.g., steel tank, etc.) by pins 512 and extrusion welds 520.

The corners 510 of the lining 500 are defined between or by adjacent pairs of corner sheets 504 and weld material. Prior to extrusion welding, the sheets 504 are separated by gaps or voids 548 along their edges. The sheets 504 are joined by infused welds 520 formed by extrusion welding, such that the infused welds 520 fills the gaps 548 between the sheets 504 and seals the sheets 504 such that the lining 500 is capable of isolating the tank 508 from contents (e.g., contents being stored and/or processed, etc.) within the lined tank 508, as the contents contact the lining 500 instead of the tank walls 506.

Prior to extrusion welding, the pins 512 are coupled to (e.g., welded via a capacitive discharge stud welder, etc.) corner portions of the tank walls 506 corresponding to the corners 510 of the lining 500. Also prior to extrusion welding, the pins 512 may be positioned relative to the pairs of adjacent corner sheets 504 such that portions (e.g., shaft, head, etc.) of the pins 512 are located within the gaps or voids 548 separating opposing edges of the pairs of adjacent corner sheets 504. Depending on the particular configuration of the pins 512 (e.g., straight pin without a large head, etc.), the pins 512 may be bent as shown in FIG. 12 to create a better retention and interlock with the extrusion welds 520.

Molten thermoplastic material 524 is introduced or infused along the pairs of adjacent corner sheets 504 by extrusion welding such that molten thermoplastic material 524 infuses within the gaps or voids 548 between the pairs of adjacent corner sheets 504. This extrusion welding also introduces or infuses molten thermoplastic material 524 over and/or around portions of the pins 512, including the pins' bent portions as shown in FIG. 13.

After the molten thermoplastic material 524 cools and solidifies, the solidified molten thermoplastic material surrounding, encapsulating, and/or in contact with portions of the pins 512 allows the pins 512 to help anchor (e.g., hold, retain, etc.) the extrusion welds 520. Accordingly, this exemplary embodiment anchors the extrusion welds 520 and thus the sheets 504 of lining material in the corners 510 as the pins 512 are anchored (e.g., welded, etc.) to the tank 508 and the extrusion welds 520 are anchored (e.g., held, retained, etc.) by the pins 512.

Infused molten thermoplastic material 524 may penetrate the joint to the tank walls 506 such that infused weld areas are created that help eliminate channels, pinholes, gaps, etc. behind the weld seams, which, in turn, helps reduce the probability of leaks and helps increase the service life of the tank. If a leak happens, then the welds help block solution from flowing behind the lining 500. Accordingly, the exemplary embodiment of the lining 500 may advantageously have a relatively long service life, have welds that are solid and strong (more tolerable to stresses), and have fewer welds as compared to conventional linings.

FIG. 14 illustrates an exemplary embodiment of a bottom corner piece 650 that may be externally located at, disposed along, and/or define each bottom corner of a frame structure (e.g., frame structure of a large field erected frame liner, etc.) or a liner (e.g., a shop pre-fabricated frame drop-in liner, etc.). The corner piece 650 may comprise molded Type II (hi-impact rigid) PVC or other suitable material for absorbing the impact if the liner having a corner piece 650 at each corner is dropped. By way of example, the corner piece 650 may be formed via thermoforming, vacuum forming, other suitable molding process, etc.

FIG. 15 illustrates an exemplary embodiment of a liner 600 that includes the corner piece 650 at or along each bottom corner. The liner 600 includes sheets, panels, or walls 604 anchored in their corners 610 to a frame or frame structure 608 by mechanical fasteners and extrusion welds 620. The frame 608 has members or components 630 (e.g., 3 inch by 3 inch stainless or carbon steel angles, etc.) externally disposed along the corners 610 of the liner 600.

The frame 608 also includes a full bottom plate, panel, sheet, or wall in this example. By way of example, the full bottom plate may comprise rigid Type II (hi-impact) PVC, and the liner material may comprise sheets of Koroseal® plasticized PVC extrusion welded together at the joints between the sheets. This example may also include corner inserts made of Koroseal® plasticized PVC. The frame 608 may comprise angles (e.g., 3 inch angles, etc.) framing the perimeter. The full bottom plate may be placed on top of the bottom flange of the angle framing the perimeter such that it would be locked in by sitting on top of the bottom flange of the perimeter angle. The full piece bottom may provide good protection from forklifts, etc. during shipping and handling of the liner 600 and also inhibit the forklift from cutting, gouging, etc. the liner material, for example, when the liner material is a relatively flexible and soft material such as Koroseal® plasticized polyvinyl chloride material, etc.

The corner pieces 650 may be externally disposed over the lower portions of the frame members 630 along the corners 610 of the liner 600, such that the corner pieces 650 define or provide the three dimensional true bottom corners of the frame structure 608 and liner 600. The corner pieces 650 may be coupled to the liner 600 or frame structure 608 in various ways.

By way of example, the frame members 630 may be steel angles to which the corner pieces 650 are coupled to the frame structure 608. In this example, the steel angles are disposed under the corner pieces 650 from both sides. One angle is cut out to fit into the other angle. Then, one of the angles extends upward behind the corner piece 650 and up to the vertical top corner to the top of the tank. The outer frame 608 is welded together, and the corner pieces 650 are welded to the frame. After the liner 600 is assembled with the extrusion welds 620 anchored to the frame 608, the extrusion welds of the liner 600 should not crack even if the welds of the outer frame 608 should crack.

As another example, the frame members 630 may be extrusion welded at or along the edges of the corner pieces 650. Or, for example, the corner pieces 650 may be extrusion welded along their lower portions to edges of the bottom plate, which may have cutouts to match the corner pieces 650. The extrusion welds may be relatively flexible and have some give so as to inhibit cracking.

In use, the corner pieces 650 provide protection against and inhibit cracking of the frame structure 608 if the liner 600 is dropped, such as from a forklift when the liner is being installed into a tank, etc. Accordingly, the corner pieces 650 may thus serve as underlying firm and indestructible true corner bases for the welded frame structure 608. But even if the welds of a frame structure did crack, the cracks in the frame structure should not significantly adversely affect the performance of the liner as the welds of the frame structure are not in immersion service. Plus, the liner's anchored extrusion welds and corner insert welds would remain uncracked and pin-hole free.

The inventor hereof has recognized that with relatively large and heavy conventional liners, it is possible that their welded joints may crack if a liner is dropped. Accordingly, the inventor has disclosed herein corner pieces configured to provide protection against and inhibit cracking if a liner is dropped. The corner pieces may also provide a firm and flat surface for corner inserts (e.g., corner insert 340 (FIG. 11), etc.).

By way of example only, exemplary embodiments disclosed herein may be extrusion welded by a method and/or device as disclosed in U.S. patent application Ser. No. 13/396,231 and/or U.S. Pat. No. 8,133,345. For example, FIG. 16 illustrates an exemplary handle-held extrusion-welding device 58 that may be used to extrusion weld sheets 40, 44 of lining or liner material. In this example, the welding device 58 is made up essentially of a hand-held drill serving as the drive system and removable attachment for this drill. In the attachment, a strand of thermoplastic material 60, supplied via one or several feed channels from a feed device, is chopped up. The thermoplastic material 60 is heated in a conveying device usually in the form of a worm conveyor and a plastering device so that the chopped thermoplastic material 60 reaches a plastic state and is then expelled as welding material through a welding chute of the welding device 58. The chute includes a degenerating device in the shape of an internal blower as well as a heating device.

Accordingly, exemplary embodiments include extrusion welding that comprises heating and forcing out, under constant pressure and temperature, the thermoplastic material 60. Infusing the thermoplastic material 60 under the controlled parameters of constant pressure and constant temperature over time helps reduce, minimize, or preferably eliminate pinholes. Also in exemplary embodiments, the extrusion welder 58 controls melt pressure and melt temperature with a display and control box for convenient operation and monitoring. Because of the controlled pressure and temperature, the extruded thermoplastic material 60 may thus fuse more material within the sheets than other weld methods. With this automatic application of thermoplastic material 60 under controlled parameters, a thicker, deeper, and stronger extrusion weld 62 may be created while also reducing, minimizing, or preferably eliminating pinholes.

In exemplary embodiments, the thermoplastic material 60 may comprise permanent thermoplastic lining materials such as, but not limited to, plasticized polyvinyl chloride, flexible polyvinyl chloride (F-PVC), rigid polyvinyl chloride, chlorinated polyvinyl chloride (CPVC), polyethylene (e.g., high molecular weight polyethylene (HMWPE), high-density polyethylene (HDPE), low-density polyethylene (LDPE), etc.), polyurethane/PVC alloy, synthetic rubber, fluoropolymer (homopolymer, copolymers (e.g., Poly(vinylidene fluoride-co-hexafluoropropene) (PVDF-HFP), etc.) or alloys), ethylene-chloro-tri-fluoro-ethylene (Halar ECTFE), laminations of thermoplastic materials such as above, etc.

Table 1 lists strength test results for a variety of weld locations for the inventor's extrusion welds and prior art welds. The tests were conducted on an Instron Model 1122 1,000 lb. load cell, wherein the welds tested were used with Koroseal® material. In the table, the "base" refers to the stock material with no welds whatsoever. The "corner extrusion weld" position refers to a welding for extrusion welding a pair of side sheets. The "prior art weld" position refers to conventional or current welding processes, such as a strip weld process. As shown in Table 1, the inventor's welding processes result in higher weld strengths than the prior art welds.

TABLE 1

| Weld | Material Thickness | Temperature | Failure Load pounds per inch | Weld Strength pounds per inch |
|---|---|---|---|---|
| Base | 3/32 inch | 70° F. | 233 | 245 |
| Corner Extrusion Weld | 3/32 inch | 70° F. | 228 | 228 |
| Prior Art Weld | 3/32 inch | 70° F. | 163 | 165 |
| Base | 3/16 inch | 70° F. | 485 | 414 |
| Corner Extrusion Weld | 3/16 inch | 70° F. | 324 | 317 |
| Prior Art Weld | 3/16 inch | 70° F. | 306 | 227 |
| Corner Extrusion Weld | 3/16 inch | 180° F. | 135 | 98 |
| Prior Art Weld | 3/16 inch | 180° F. | 78 | 54 |
| Butt Weld | 3/16 inch | 70° F. | 405 | 397 |

In exemplary embodiments, sheets, panels, or walls of liner or lining material may be cut from a roll of material such as plasticized polyvinyl chloride (PVC) sheet membrane. An example material that may be used for a liner or lining is a material sold under the brand name Koroseal® or High Performance Koroseal® manufactured by R.J.F. International Corporation. Other exemplary materials that may be used for a liner or lining include Anchor-Lok® thermoplastic lining material from ATLAS Minerals and Chemicals, Inc., or T-Lock® or Arrow-Lock® from Ameron Protective Linings, or Exceline from F.C. Witt Associates Ltd. In yet other embodiments, a liner or lining may comprise various other materials, such as rigid PVC type 1, rigid PVC type 2, vinyl or specially formulated flexible PVC, chlorinated polyvinyl chloride (CPVC), polypropylene (PPL), copolymer polypropylene (CoPPL), fiberglass reinforced plastic (FRP), polytetrafluoroethylene (PTFE); ethylene chlorotrifluoroethylene copolymer (ECTFE), polyvinylidene fluoride (PVDF), rubber, etc. In some exemplary embodiments, the sheets of a liner or lining may include full-size RF (radio frequency) welded and/or overlapping extrusion welded high performance Koroseal® panels (e.g., Koroseal® flexible PVC sheets, etc.), which helps eliminate lining seams in tank walls and bottom.

Exemplary embodiments disclosed herein may provide a vessel for storing or processing fluids, which combines advantages of loose liners with those of adhered linings. In an exemplary embodiment, a vessel includes a type II PVC frame with full bottom plate includes full-panel, high performance Koroseal® sheets that are joined by extrusion welding and with mechanically fastened perimeter welds. In this example, the vessel is configured so as to avoid both temperature limits and added costs of an adhesive bonded lining, yet has its perimeter welds anchored to a solid frame structure for lasting performance.

Exemplary embodiments of the inventor's liners and linings include welds that are formed with extrusion welding machines such that the welds are preferably designed to eliminate gaps resulting from imperfect hand welded seams. The hot gas/hot air extrusion welding machine techniques overcome disadvantages that are characteristic of hand-welding, such as channels, pinholes, and gaps that can form behind hand welded seams and allow the solution in a tank or pit to flow behind the liner or lining and corrode the substrate if a leak occurs. The inventor's techniques modify the preheating process and delivery of the weld material. For example, a welding machine extrudes a high-performance, plasticized PVC weld material that infuses into the substrate's pores and voids as well as joins the PVC sheets that form the liner. Rather than extending the sheets, panels, or walls of liner or lining material, the sheets are configured or shortened to leave a relatively small gap at the joints or corner intersections. This allows molten thermoplastic weld material to flow into and fill the gap between the sheets. Molten thermoplastic weld material may also penetrate the joint or interface between the liner and frame (e.g., drywall corner beads, plastic frame, wooden frame, etc.). Or with a lining, molten thermoplastic weld material may penetrate the joint or interface between the lining and tank. If the extrusion welding is performed while the liner or lining is within a tank, molten thermoplastic material may flow and reach the tank walls. In which case, molten thermoplastic material may remediate and repair the tank such as by filing crevices, etc. if the tank walls are corroded.

Molten thermoplastic weld material flows around portions of mechanical fasteners, which fasteners are anchored (e.g., fastened, attached, etc.) to the frame or tank. This creates infused weld areas such that the weld areas and sheets of liner or lining material are anchored in the corners as the mechanical fasteners are anchored to the frame or tank and the extrusion welds are anchored (e.g., held, retained, etc.) by the mechanical fasteners. The infused molten thermoplastic material also helps eliminate channels, pinholes, and gaps behind the weld seams, which, in turn, helps reduce the probability of leaks, and helps increase the service life of the tank, pit, storage vessel, etc. Should a leak happen, the weld helps block solution from flowing behind the liner or lining.

Also with the inventor's hot gas/hot air extrusion welding machine techniques the welding rod may be fully melted, which results in a homogenous weld with fewer stresses. The weld may be formed in a single pass, further reducing stresses introduced by the multiple passes common in traditional hand welding. The inventor's extrusion welding is faster and is less sensitive to surface oxidation.

As recognized by the inventor hereof, the inner bottom corners where three intersecting sheets must be joined are typical problem areas and a frequent source of early leaks and premature failures with conventional linings in that it is difficult to perform a high-quality weld in a corner. This is because high-quality welds need the right speed, temperature, and pressure as the welding machine is moved along the joint. But at a corner, the sheets can't be preheated because the welding machine stops. The inventor's molded thermoplastic corner inserts enable the welding machine to weld continuously in the corners without having to stop at the corners of the frame-anchored liners. Accordingly, exemplary embodiments of the inventor's liners and linings may further include molded corner inserts in the corners as disclosed in U.S. patent application Ser. No. 13/396,231 and/or U.S. Pat. No. 8,133,345.

In some exemplary embodiments in which a liner or lining is intended for a large tank, the liner or lining may include full-size RF (radio frequency) welded and/or overlapping extrusion welded high performance Koroseal® panels (e.g., Koroseal® flexible PVC sheets, etc.) to eliminate seams. For example, if a tank is very large, a liner or lining may include large sub-panels joined by skived edges with overlapped extrusion welds. This, in turn, may help avoid entrapped air, similar to rubber joints, and eliminate hand welds with seam strips in immersion service.

Exemplary embodiments of the inventor's liners may be used with various types of tanks, including tanks intended for different uses, different sizes and shapes, formed from different materials (e.g., steel, fiberglass, rubber, lead, plastic, wood, recycled composite wood, etc.), different types of tanks (e.g., process tanks, indoor or outdoor containment pits, other storage or liquid containment vessels, etc.), etc. By way of example, a liner or lining disclosed herein may include one or more side sheets bonded to the corner sheets by welds (e.g., butt-weld/infused weld, etc.). Multiple side sheets may be bonded and welded along any particular side of the liner or lining depending on the relative size of the sheets to the tank in which the liner or lining will be used. As the tank may have a substantially tall height, ascending rows of corner sheets and side sheets may be also be bonded by welds. Also the sheets may have a rectangular configuration or different configuration. The size and shape of the sheets may be configured (e.g., cut, etc.) to match the interior surface of a tank in which the liner or lining will be used. Because the sheets may contract and expand slightly in width during installation operations and during use due to thermal expansion and contraction, the sheets may be oversized to allow for such dimensional changes. In an exemplary embodiment, the thickness of the sheets may be about 3/32 inches. In another exemplary embodiment, the thickness of the sheets may be about 3/16 inches. These dimensions disclosed in this paragraph (as are all dimensions disclosed herein) are example in nature as other exemplary embodiments of a liner or lining may be sized dimensionally larger or smaller depending on the tank to which they will be applied.

Exemplary embodiments may be configured to be used as relatively rigid "drop-in" liners, which may possess superior perimeter machine welds and which may be mechanically anchored to a frame or framework for placement into a tank. In such exemplary embodiments, the frame-anchored liners do not float in the tank as do some bag liners. The frame-anchored liners may also allow reductions in costs and downtime as compared to some conventional lining bonding methods as the inventor's frame-anchored liners may be installed and positioned within a tank without having to first prep the tank's interior surface and/or without having to remove an existing lining, if there is one. For example, an exemplary embodiment of the inventor's liner may be installed or "dropped in" a tank without having to blast, grind, prime, apply adhesive, etc. to the interior of the tank as is required for some conventional linings.

Exemplary embodiments of the inventors' frame-anchored liners may be installed in or added to used tanks of steel, fiberglass, rubber, lead, plastic, etc., whereby the liner restores the used tank to equal or better than original condition and/or increases the service life of the used tank. The inventor's liners may also allow new tanks to be constructed of lower cost materials, e.g., recycled lumber, plywood, alternative building components, etc. as the inventor's liners when installed provide a corrosion barrier between the tank walls and the corrosive contents stored within the tank. In an exemplary embodiment, the inventor has disclosed a frame-anchored drop-in free-standing liner that may be installed in a tank made of wood, plastic lumber, composite wood, etc. whereby the liner provides good corrosion resistance inside the tank and exterior steel corrosion is no longer an issue for the exterior of the non-steel tank. Spark testing and leak detection are also available with exemplary embodiments of the inventor's liners and linings disclosed herein.

Exemplary embodiments (not shown) of a lining or liner may further include an absorption layer or impact absorbing bumper pad positioned over and/or bonded to the top of the bottom sheet. This impact protective layer may comprise a honeycomb, egg-crate, and/or laminate structure, such as a non-float (high specific gravity) thermoplastic. The structure may also comprise compressible material that absorbs impact from dropped parts. By being made of pieces of a size and weight easily handled by installation personnel, this structure is easily removed from the tank bottom if a lining or liner repair on or near the bottom is required.

Example embodiments are provided so that this disclosure will be thorough, and will fully convey the scope to those who are skilled in the art. Numerous specific details are set forth such as examples of specific components, devices, and methods, to provide a thorough understanding of embodiments of the present disclosure. It will be apparent to those skilled in the art that specific details need not be employed, that example embodiments may be embodied in many different forms and that neither should be construed to limit the scope of the disclosure. In some example embodiments, well-known processes, well-known device structures, and well-known technologies are not described in detail. In addition, advantages and improvements that may be achieved with one or more exemplary embodiments of the present disclosure are provided for purpose of illustration only and do not limit the scope of the present disclosure, as exemplary embodiments disclosed herein may provide all or none of the above mentioned advantages and improvements and still fall within the scope of the present disclosure.

Specific dimensions, specific materials, and/or specific shapes disclosed herein are example in nature and do not limit the scope of the present disclosure. The disclosure herein of particular values and particular ranges of values for given parameters are not exclusive of other values and ranges of values that may be useful in one or more of the examples disclosed herein. Moreover, it is envisioned that any two particular values for a specific parameter stated herein may define the endpoints of a range of values that may be suitable for the given parameter (the disclosure of a first value and a second value for a given parameter can be interpreted as disclosing that any value between the first and second values could also be employed for the given parameter). Similarly, it is envisioned that disclosure of two or more ranges of values for a parameter (whether such ranges are nested, overlapping or distinct) subsume all possible combination of ranges for the value that might be claimed using endpoints of the disclosed ranges. In addition, disclosure of ranges includes disclosure of all distinct values and further divided ranges within the entire range.

The terminology used herein is for the purpose of describing particular example embodiments only and is not intended to be limiting. For example and for descriptive purposes only, the term "liner" may be used herein to refer to a free standing liner (e.g., drop-in liner, etc.) for a tank where the liner is not or will not be adhesively bonded directly to the tank's walls and bottom. As another example, the term "lining" may be used herein to refer to a lining for a tank where the lining will be or is adhesively bonded directly to the tank's walls and bottom. For descriptive purposes only, the terms "liner" and "lining" may also be used interchangeably herein when describing some embodiments As used herein, the singular forms "a," "an," and "the" may be intended to include the plural forms as well, unless the context clearly indicates otherwise. The terms "comprises," "comprising," "including," and "having," are inclusive and therefore specify the presence of stated features, integers, steps, operations, elements, and/or components, but do not preclude the presence or addition of one or more other features, integers, steps, operations, elements, components, and/or groups thereof. The method steps, processes, and operations described herein are not to be construed as necessarily requiring their performance in the particular order discussed or illustrated, unless specifically identified as an order of performance. It is also to be understood that additional or alternative steps may be employed.

When an element or layer is referred to as being "on," "engaged to," "connected to," or "coupled to" another element or layer, it may be directly on, engaged, connected or coupled to the other element or layer, or intervening elements or layers may be present. In contrast, when an element is referred to as being "directly on," "directly engaged to," "directly connected to," or "directly coupled to" another element or layer, there may be no intervening elements or layers present. Other words used to describe the relationship between elements should be interpreted in a like fashion (e.g., "between" versus "directly between," "adjacent" versus "directly adjacent," etc.). As used herein, the term "and/or" includes any and all combinations of one or more of the associated listed items. The term "about" when applied to values indicates that the calculation or the measurement allows some slight imprecision in the value (with some approach to exactness in the value; approximately or reasonably close to the value; nearly). If, for some reason, the imprecision provided by "about" is not otherwise understood in the art with this ordinary meaning, then "about" as used herein indicates at least variations that may arise from ordinary methods of measuring or using such parameters. For example, the terms "generally", "about", and "substantially" may be used herein to mean within manufacturing tolerances.

Although the terms first, second, third, etc. may be used herein to describe various elements, components, regions, layers and/or sections, these elements, components, regions, layers and/or sections should not be limited by these terms. These terms may be only used to distinguish one element, component, region, layer or section from another region, layer or section. Terms such as "first," "second," and other numerical terms when used herein do not imply a sequence or order unless clearly indicated by the context. Thus, a first element, component, region, layer or section discussed below could be termed a second element, component, region, layer or section without departing from the teachings of the example embodiments Spatially relative terms, such as "inner," "outer," "beneath," "below," "lower," "above," "upper," and the like, may be used herein for ease of description to describe one element or feature's relationship to another element(s) or feature(s) as illustrated in the figures. Spatially relative terms may be intended to encompass different orientations of the device in use or operation in addition to the orientation depicted in the figures. For example, if the device in the figures is turned over, elements described as "below" or "beneath" other elements or features would then be oriented "above" the other elements or features. Thus, the example term "below" can encompass both an orientation of above and below. The device may be otherwise oriented (rotated 90 degrees or at other orientations) and the spatially relative descriptors used herein interpreted accordingly.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

What is claimed is:

1. An apparatus for lining a tank, the apparatus comprising a bottom sheet, a plurality of side sheets, at least one pair of adjacent side sheets joined by an extrusion weld along an interface between the pair of adjacent side sheets, and at least one mechanical fastener including a first end and a second end opposite the first end, the first end including a protrusion, the second end coupled to at least one structural component such that the pair of adjacent side sheets is anchored to the structural component, the protrusion of the first end positioned within or adjacent to a gap between the pair of adjacent side sheets, the extrusion weld coupled to the at least one mechanical fastener and encapsulating the protrusion of the at least one mechanical fastener within the gap, wherein the extrusion weld comprises thermoplastic material, and wherein the mechanical fastener comprises a hollow interior portion in which a portion of the thermoplastic material has infused.

2. The apparatus of claim 1, wherein the pair of adjacent side sheets is joined by the extrusion weld infused within the gap between the pair of adjacent side sheets.

3. The apparatus of claim 2, wherein the extrusion weld comprises thermoplastic material that fills the gap.

4. The apparatus of claim 1, wherein:
the plurality of side sheets are configured such that a gap is between each pair of adjacent side sheets of the plurality of side sheets;
each pair of adjacent side sheets are joined by an extrusion weld infused within the gap and along an interface between each corresponding pair of adjacent side sheets; and
the plurality of side sheets are joined to the bottom sheet by an extrusion weld.

5. The apparatus of claim 4, wherein:
the structural component comprises a tank;
the at least one mechanical fastener includes a plurality of mechanical fasteners coupled to the tank and the extrusion welds; and
the apparatus includes corners defined by the plurality of side sheets that are anchored to the tank by the plurality of mechanical fasteners coupled to the tank and the extrusion welds.

6. An apparatus for lining a tank, the apparatus comprising a bottom sheet, a plurality of side sheets, at least one pair of adjacent side sheets joined by an extrusion weld along an interface between the pair of adjacent side sheets, and at least one mechanical fastener including a first end and a second end opposite the first end, the first end including a protrusion, the second end coupled to at least one structural component such that the pair of adjacent side sheets is anchored to the structural component, the protrusion of the first end positioned within or adjacent to a gap between the pair of adjacent side sheets, the extrusion weld coupled to the at least one mechanical fastener and encapsulating the protrusion of the at least one mechanical fastener within the gap, wherein the extrusion weld comprises thermoplastic material, and wherein the mechanical fastener comprises at least one rivet having a hollow interior portion in which a portion of the thermoplastic material has infused.

7. The apparatus of claim 1, wherein
the structural component comprises one or more drywall corner beads.

8. The apparatus of claim 1, wherein:
the plurality of side sheets and bottom sheet comprise flexible polyvinyl chloride; and
the structural component comprises one or more of rigid polyvinyl chloride, stainless steel, and/or carbon steel; and
an insert is extrusion welded at a corner formed by the pair of adjacent side sheets and bottom sheet.

9. A tank comprising the apparatus of claim 1, wherein:
the tank comprises a bottom and sidewalls defining corners;
each pair of adjacent side sheets are joined by an extrusion weld;
the at least one mechanical fastener includes a plurality of mechanical fasteners coupled to corners of the tank and to the extrusion welds;
the apparatus includes corners defined by the plurality of side sheets that are anchored to the corners of the tank by the plurality of mechanical fasteners coupled to the tank and the extrusion welds;
the bottom sheet comprises a sheet of lining material adjacent the bottom of the tank; and
the plurality of side sheets comprises sheets of lining material adjacent to the sidewalls of the tank.

10. A lining comprising the apparatus of claim 1, wherein the structural component comprises a tank to which the pair of adjacent side sheets is anchored by the mechanical fastener coupled to the tank and the extrusion weld coupled to the mechanical fastener.

11. The apparatus of claim 1, wherein the plurality of side sheets and the bottom sheet collectively define an internal volume usable for storage of materials, such that the plurality of side sheets and the bottom sheet are usable as a standalone tank.

12. A liner comprising the apparatus of claim 1, wherein the structural component comprises an outer shell or a frame to which the pair of adjacent side sheets is anchored by the mechanical fastener coupled to the structural component and the extrusion weld coupled to the mechanical fastener.

13. A tank comprising
a bottom sheet, a plurality of side sheets, at least one pair of adjacent side sheets joined by an extrusion weld along an interface between the pair of adjacent side sheets, and at least one mechanical fastener including a first end and a second end opposite the first end, the first end including a protrusion, the second end coupled to at least one structural component such that the pair of adjacent side sheets is anchored to the structural component, the protrusion of the first end positioned within or adjacent to a gap between the pair of adjacent side sheets, the extrusion weld coupled to the at least one mechanical fastener and encapsulating the protrusion of the at least one mechanical fastener within the gap, wherein the extrusion weld comprises thermoplastic material, and wherein the mechanical fastener comprises a hollow interior portion in which a portion of the thermoplastic material has infused.

14. The tank of claim 13, wherein the at least one structural component comprises a sidewall of the tank, a frame, or an outer shell.

15. The tank of claim 13, further comprising one or more bottom corner pieces configured for absorbing an impact, and wherein:
the one or more corner pieces are coupled to the at least one structural component; and
the one or more corner pieces are extrusion welded to the bottom sheet; and
the one or more corner pieces comprise molded Type II (hi-impact rigid) PVC.

16. The tank of claim 13, wherein the mechanical fastener comprises a rivet having the hollow interior portion.

17. The tank of claim 13, wherein:
the plurality of side sheets and bottom sheet comprise flexible polyvinyl chloride; and
the structural component comprises one or more of rigid polyvinyl chloride, stainless steel, and/or carbon steel.

18. The liner of claim 12, wherein the liner is positionable within the tank without bonding the liner to a surface of the tank.

19. The liner of claim 12, wherein the liner is a drop-in liner.

20. A method of providing a liner or lining for a tank using the apparatus of claim 16, the method comprising extrusion welding the at least one pair of adjacent side sheets together by infusing molten thermoplastic material along the interface between the pair of adjacent side sheets and about the portion of the at least one mechanical fastener, to thereby form the extrusion weld joining the pair of adjacent side sheets and coupled to the mechanical fastener, whereby the pair of adjacent side sheets is anchored to the structural component by the mechanical fastener coupled to the structural component and the extrusion weld coupled to the mechanical fastener.

21. The method of claim 1, wherein extrusion welding includes infusing molten thermoplastic material within the gap between the pair of adjacent side sheets such that the pair of adjacent side sheets is joined by the extrusion weld infused within the gap.

22. The method of claim 1, wherein extrusion welding includes infusing molten thermoplastic material within the gap between the pair of adjacent side sheets such that the thermoplastic material fills the gap and encapsulates the portion of the mechanical fastener within the gap.

23. The method of claim 1, wherein:
the mechanical fastener comprises at least on rivet having a hollow interior portion; and
extrusion welding includes infusing molten thermoplastic material such that the thermoplastic material infuses with the hollow interior portion of the rivet.

24. The method of claim 1, wherein
the structural component comprises a tank; and
extrusion welding includes infusing molten thermoplastic material within the gap between the pair of adjacent side sheets such that thermoplastic material fills the gap and penetrates through to the tank.

25. The method of claim 1, further comprising extrusion welding includes infusing molten thermoplastic material within gaps between the pair of adjacent side sheets and between a bottom sheet and the pair of adjacent side sheets, whereby the thermoplastic material infused within the gaps seals the pair of adjacent side sheets and bottom sheet and isolates contents that contact the pair of adjacent side sheets and bottom sheet from a tank.

26. The method of claim 1, wherein extrusion welding includes infusing molten thermoplastic material along an interface between a bottom sheet and a plurality of sheets including the pair of adjacent side sheets, such that the bottom sheet and plurality of sheets collectively define an internal volume usable for storage of materials, whereby the bottom sheet and the plurality of sheets are usable as a standalone tank.

27. The method of claim 1, wherein extrusion welding includes:
infusing molten thermoplastic material within a gap between beveled edges of the pair of adjacent side sheets; and/or
extrusion welding an insert at a corner formed by the pair of adjacent side sheets and a bottom sheet.

28. The method of claim 1, wherein extrusion welding includes:
moving a portable extrusion welder near the interface between the pair of adjacent side sheets;
activating the portable extrusion welder to generate and discharge the molten thermoplastic material;
controlling the pressure and temperature of the discharged molten thermoplastic material;
infusing the molten thermoplastic material from the portable extrusion welder, along the pair of adjacent side sheets and within an exposed interface of the pair of adjacent side sheets at the controlled pressure and temperature; and
infusing the molten thermoplastic material along and between the pair of adjacent side sheets at the controlled pressure and temperature.

* * * * *